US008484430B2

(12) United States Patent
Ito

(10) Patent No.: US 8,484,430 B2
(45) Date of Patent: Jul. 9, 2013

(54) MEMORY SYSTEM AND HOST DEVICE

(75) Inventor: Takafumi Ito, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 615 days.

(21) Appl. No.: 12/403,815

(22) Filed: Mar. 13, 2009

(65) Prior Publication Data
US 2010/0023721 A1 Jan. 28, 2010

(30) Foreign Application Priority Data
Jul. 23, 2008 (JP) ................................. 2008-190022

(51) Int. Cl.
G06F 12/00 (2006.01)
(52) U.S. Cl.
USPC .................. 711/170; 711/202; 711/E12.002; 711/E12.058; 711/E12.08
(58) Field of Classification Search
USPC ................................................. 711/170, 202
See application file for complete search history.

(56) References Cited

U.S. PATENT DOCUMENTS

| 5,625,792 | A * | 4/1997 | Kitani ............................ 711/113 |
| 7,694,025 | B1 * | 4/2010 | Norrie .............................. 710/3 |
| 2003/0147347 | A1 * | 8/2003 | Chen et al. ..................... 370/229 |
| 2003/0191909 | A1 * | 10/2003 | Asano et al. .................. 711/154 |
| 2005/0091455 | A1 * | 4/2005 | Kano et al. ..................... 711/114 |
| 2005/0091459 | A1 * | 4/2005 | Quach et al. ................... 711/141 |
| 2005/0166005 | A1 * | 7/2005 | Nagano et al. ................ 711/103 |
| 2006/0184723 | A1 * | 8/2006 | Sinclair et al. ................ 711/103 |
| 2007/0043924 | A1 | 2/2007 | Ito et al. |
| 2007/0226404 | A1 | 9/2007 | Ito et al. |
| 2008/0172522 | A1 | 7/2008 | Ito |
| 2008/0244211 | A1 * | 10/2008 | Ito ................................. 711/170 |

FOREIGN PATENT DOCUMENTS

| JP | 4-310148 A | 11/1992 |
| JP | 11-126488 A | 5/1999 |
| JP | 2003-15915 A | 1/2003 |
| JP | 2006-40264 | 2/2006 |
| JP | 2007-213448 A | 8/2007 |
| JP | 2007-323309 A | 12/2007 |
| JP | 2008-146255 A | 6/2008 |
| WO | WO 2005069288 A1 * | 7/2005 |

OTHER PUBLICATIONS

Office Action issued Jul. 24, 2012 in Japanese Patent Application No. 2008-190022 with English language translation.

* cited by examiner

Primary Examiner — Reginald Bragdon
Assistant Examiner — Aracelis Ruiz
(74) Attorney, Agent, or Firm — Oblon, Spivak, McClelland, Maier & Neustadt, L.L.P.

(57) ABSTRACT

A memory system includes a nonvolatile memory, and a memory controller for performing control to extend the maximum value of a logical address by erasing data of the nonvolatile memory which has become unnecessary in accordance with a command from the outside, and reassigning the data which has become unnecessary to a memory area assigned to a part of the logical address.

18 Claims, 30 Drawing Sheets

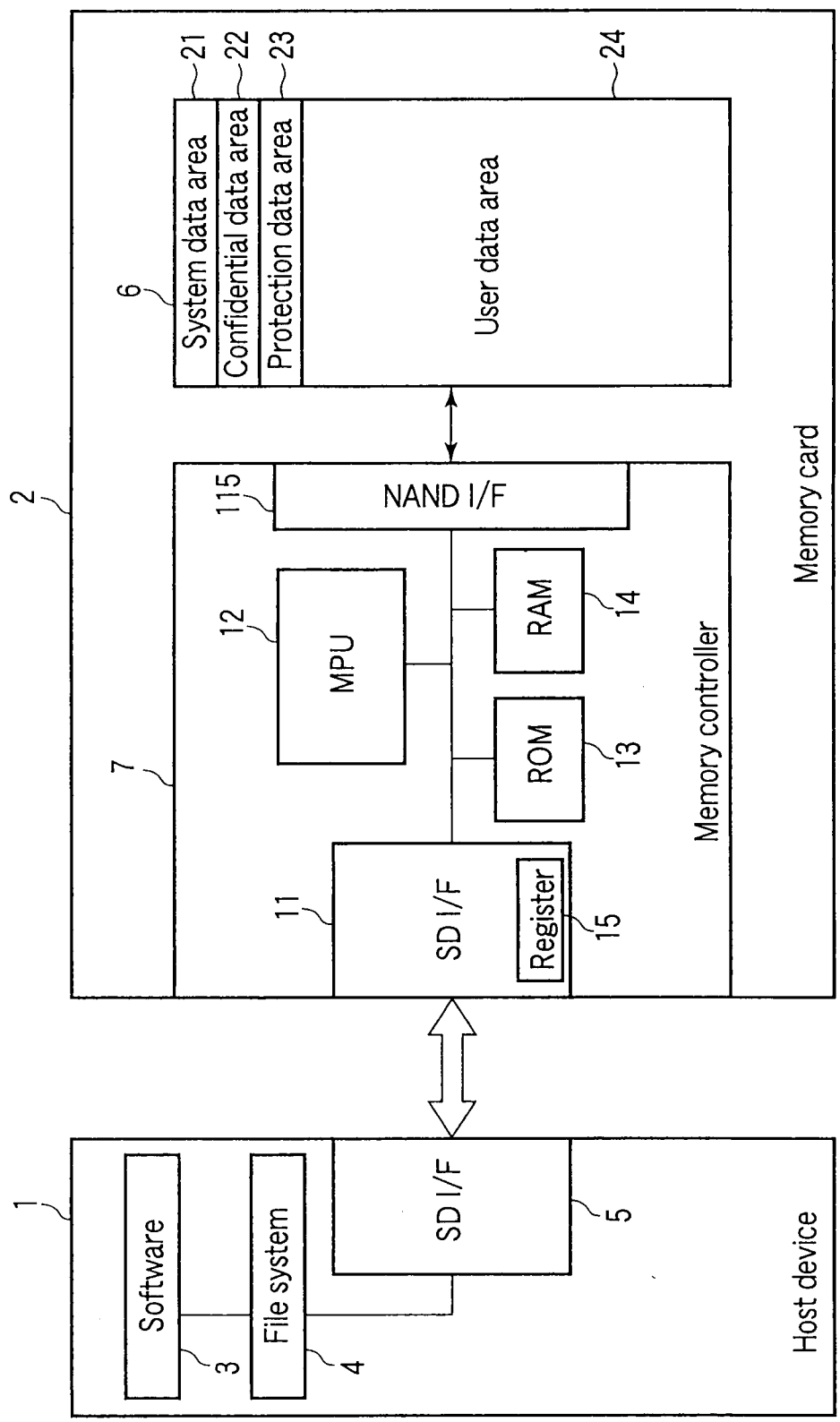
F I G. 1

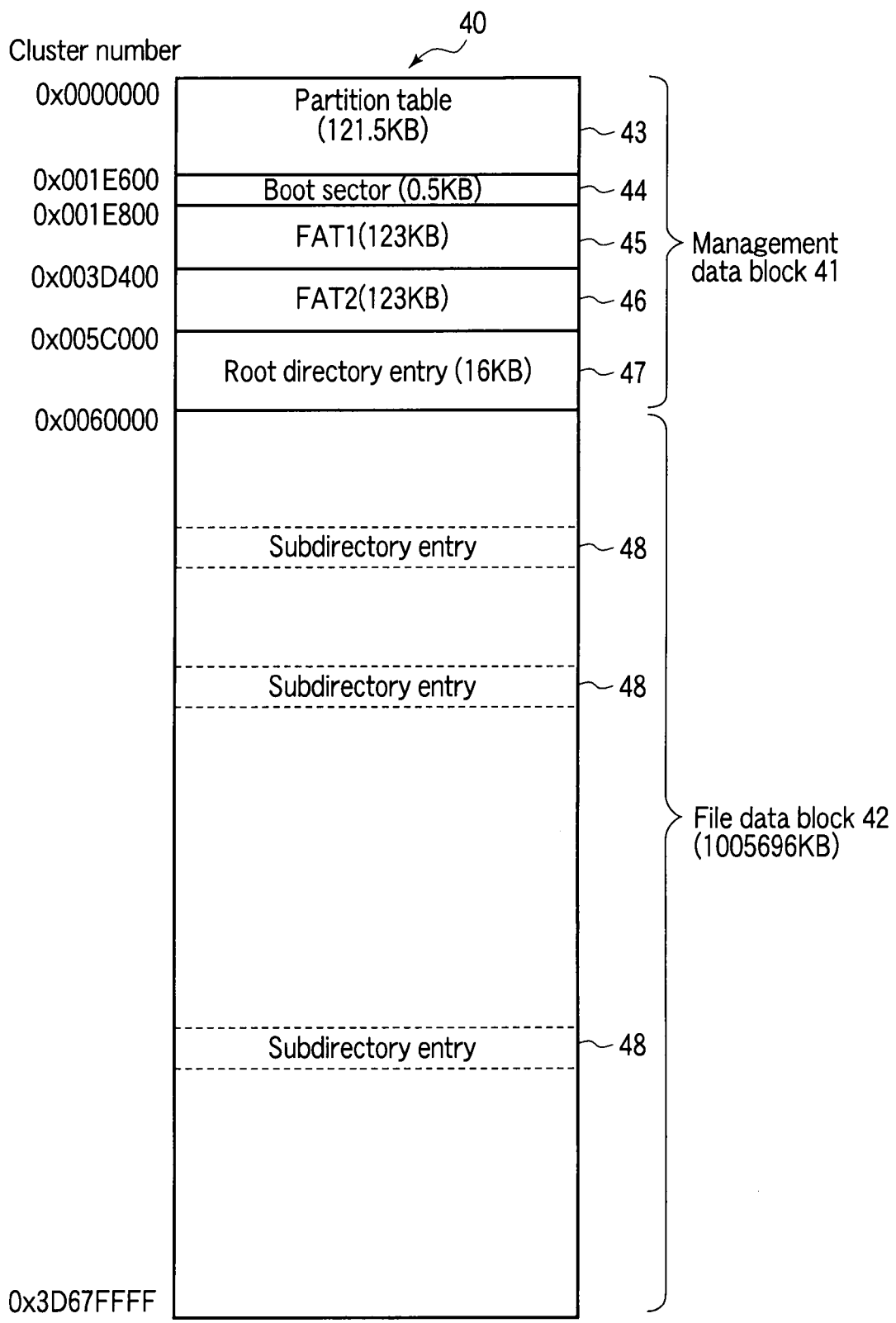
F I G. 5

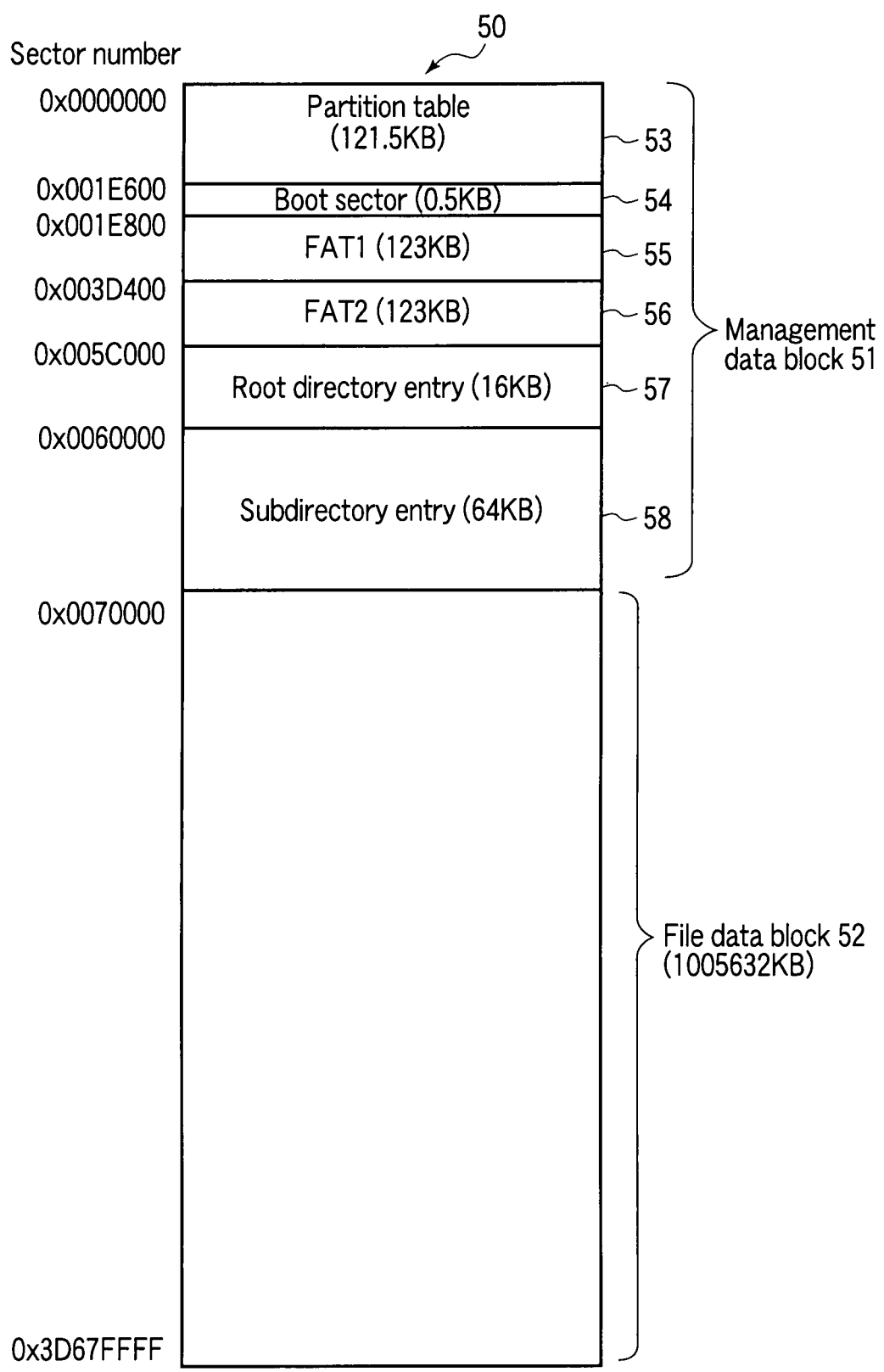
F I G. 7

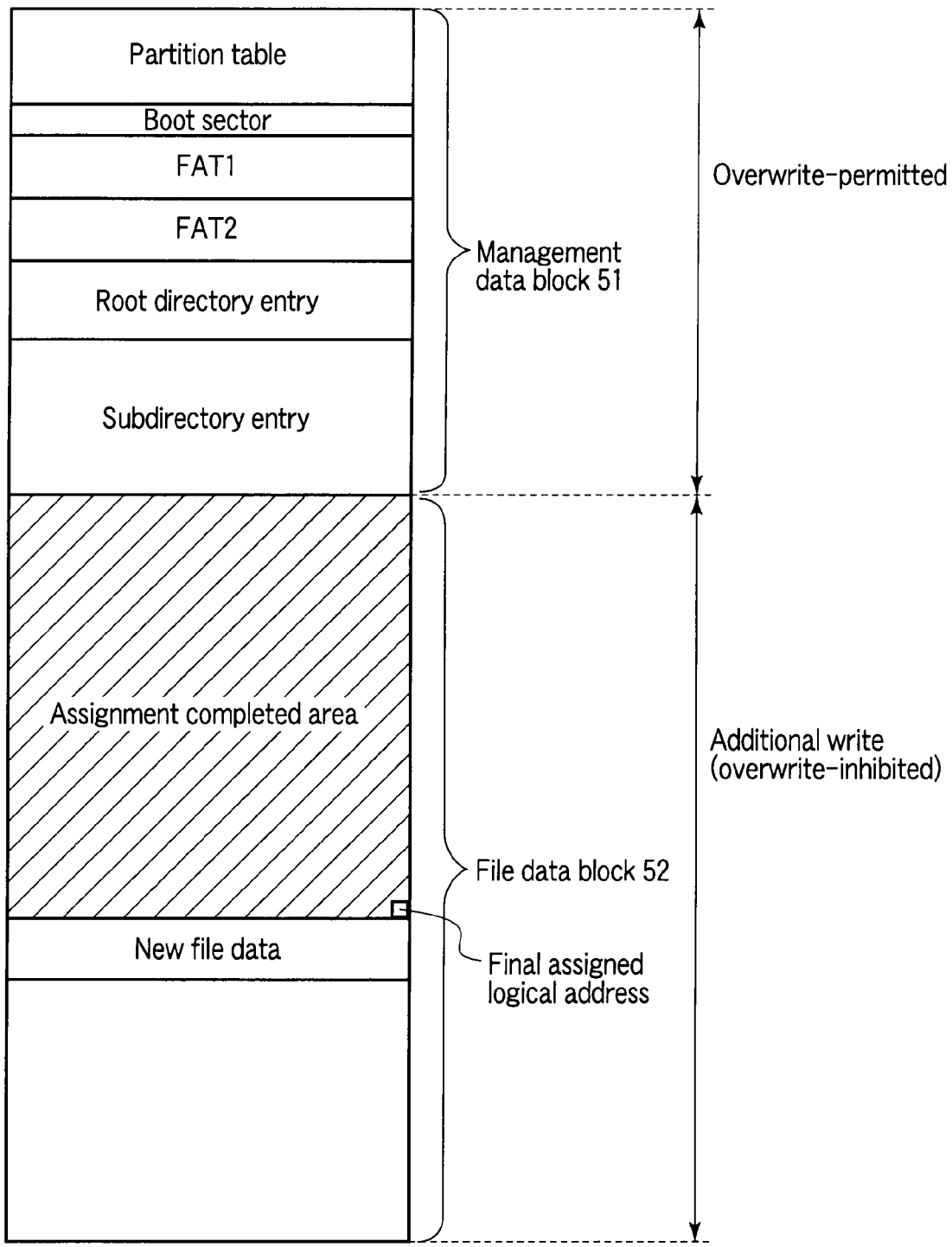
F I G. 10

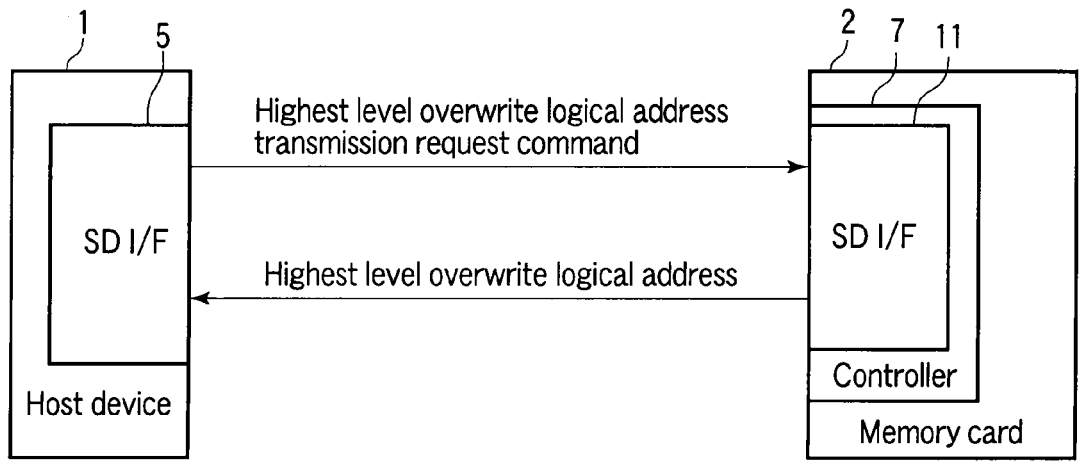
F I G. 16
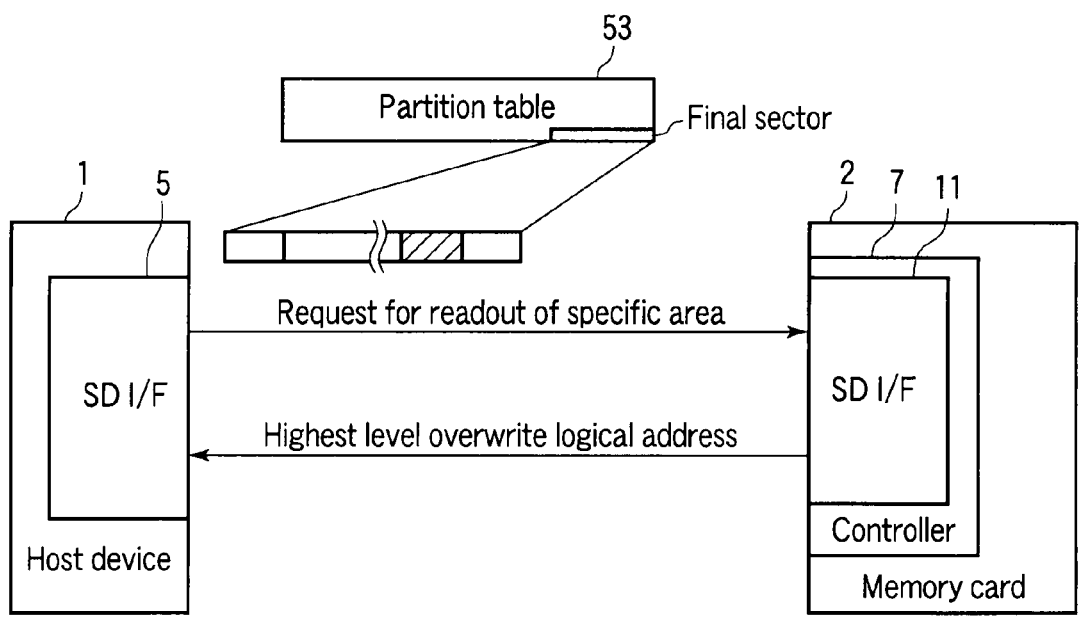
F I G. 17

| 7 | 6 | 5 | 4 | 3 | 2 | 1 | 0 |
|---|---|---|---|---|---|---|---|
| 1 | 0 | 0 |   |   |   |   |   |

Bit7　CT　　0=no restriction on management data assignment position
　　　　　　1=under restriction on management data assignment position
Bit6　OW　　0=overwrite of file data permitted
　　　　　　1=overwrite of file data inhibited
Bit5　FC　　0=memory card does not rewrite FAT
　　　　　　　(FAT need not be read out again after file write)
　　　　　　1=memory card may sometimes rewrite FAT
　　　　　　　(FAT needs to be read out again after file write)

F I G. 18

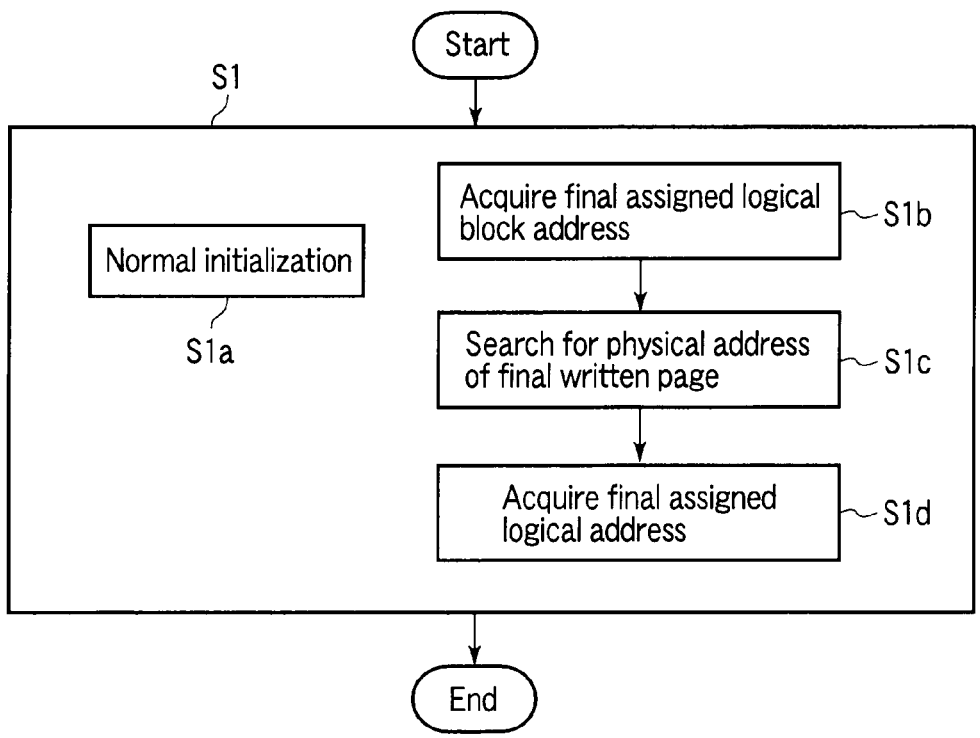

F I G. 19

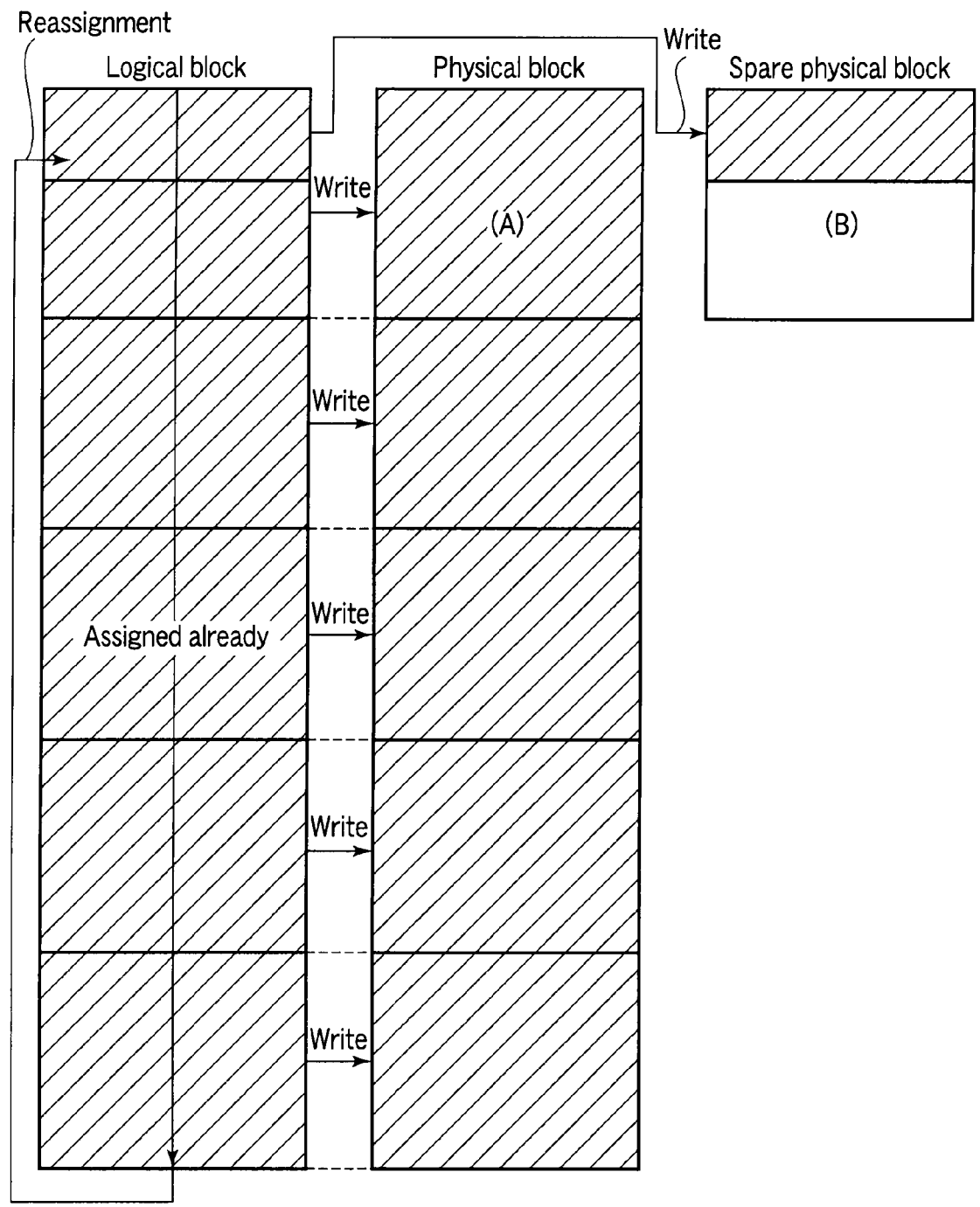
F I G. 22

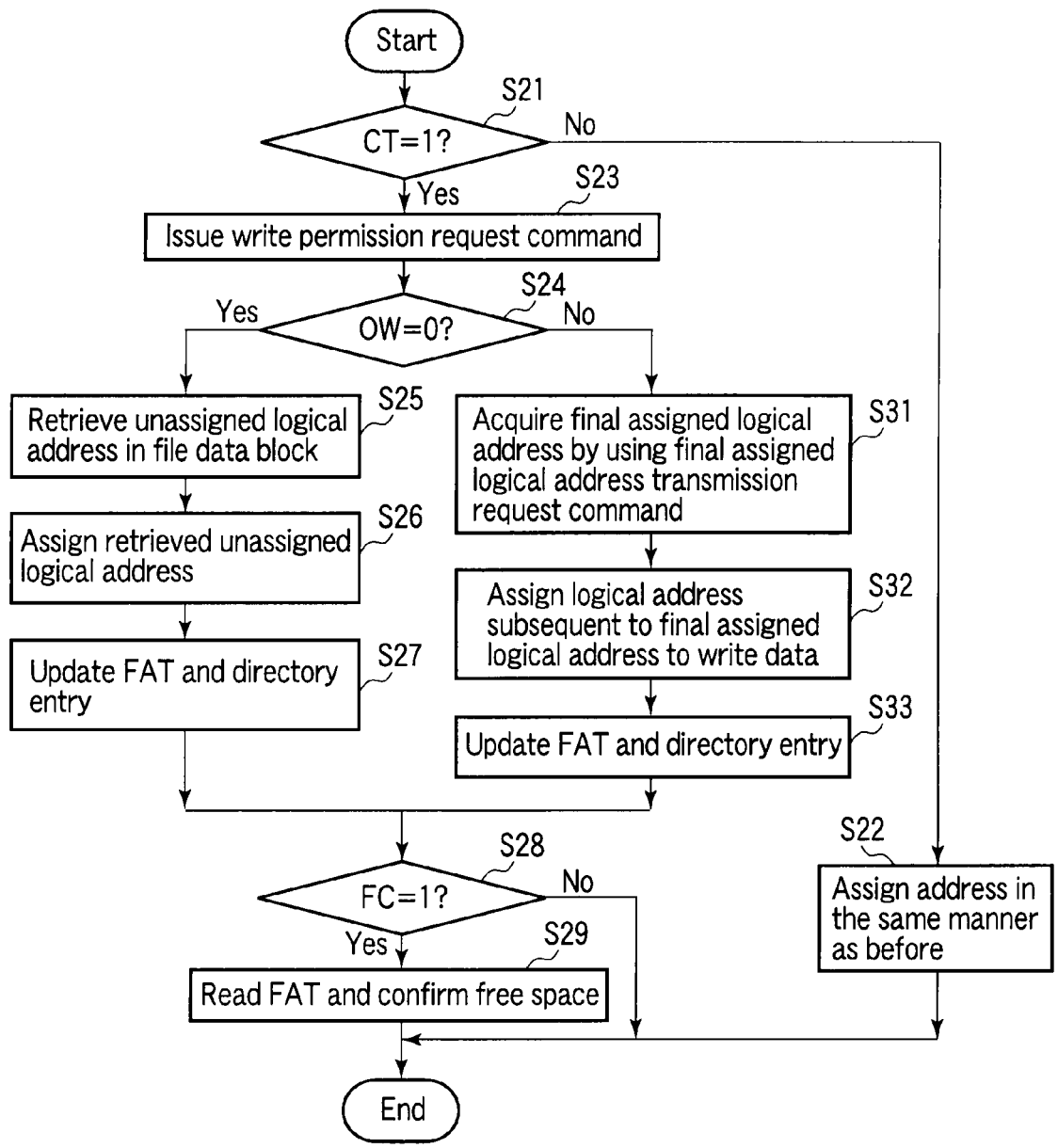
F I G. 23

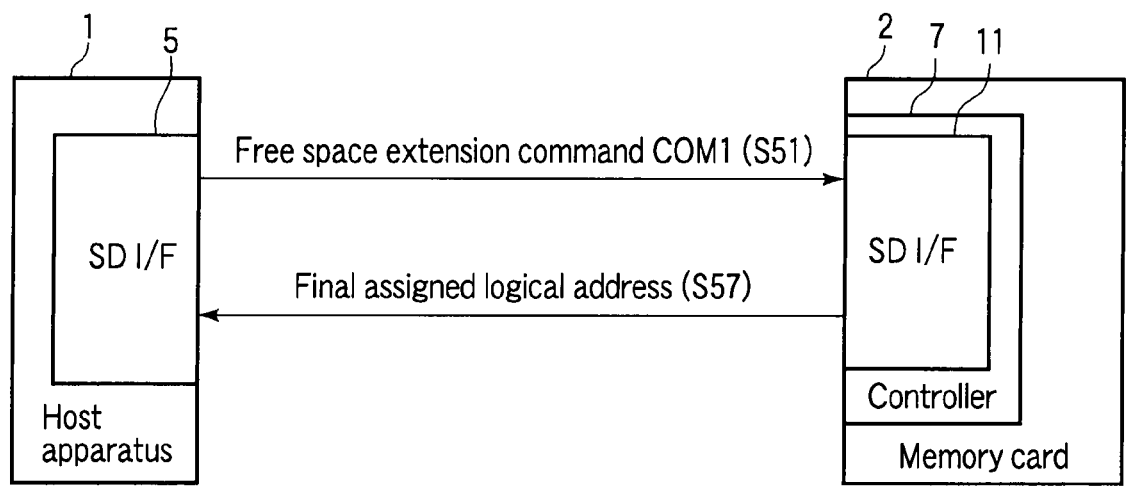
F I G. 27

Example of case of page unit

Additional write device information register (second embodiment)

| |
|---|
| (1) Additional write device flag (R) |
| (2) Final written address (R) |
| (3) Write permission data (RW) |
| (4) VAT ICB position written address 1 (RW) |
| (5) VAT ICB position written address 2 (RW) |
| (6) Data area initialization instruction (W) |

Additional write device information area

Example in which register is provided on memory map

MEMORY SYSTEM AND HOST DEVICE

CROSS-REFERENCE TO RELATED APPLICATIONS

This application is based upon and claims the benefit of priority from prior Japanese Patent Application No. 2008-190022, filed Jul. 23, 2008, the entire contents of which are incorporated herein by reference.

BACKGROUND OF THE INVENTION

1. Field of the Invention

The present invention relates to a memory system and a host device, and is applied to, for example, a memory card formatted into an additional write file system such as the UDF file system, and a host device and the like corresponding thereto.

2. Description of the Related Art

As means for efficiently writing data onto a memory system (for example, an SD card (registered trade name), and the like) into which a nonvolatile storage device such as a NAND flash memory or the like is incorporated, means to which an additional write file system such as the UDF-VAT system from the host device is applied is proposed (see, for example, Jpn. Pat. Appln. KOKAI Publication No. 2006-40264).

Here, in an overwrite type file system such as the FAT file system, when an unnecessary file is deleted, the free space of the storage area is increased correspondingly.

However, in the additional write file system such as the UDF-VAT system, even when a file is deleted, information indicating "the file has been deleted" is additionally written onto the nonvolatile memory. For this reason, the free space of the storage area cannot be increased by only deleting the file.

Further, in the additional write file system, in order to increase the free space of the storage area by deleting a file, it is necessary to, after deleting the file, rewrite data of addresses after the area in which the data of deleted file has been stored in sequence to tighten the area so that no unnecessary area is present in the addresses of the deleted area, and rewrite the pointer of the file information (so-called garbage collection). As a result of this, there is a tendency in the system to take much time in processing, and worsen the usability. Further, there has been a drawback in the system that the number of times of write to the NAND flash memory becomes large.

BRIEF SUMMARY OF THE INVENTION

A memory system according to an aspect of the present invention comprising a nonvolatile memory; and a memory controller for performing control to extend the maximum value of a logical address by erasing data of the nonvolatile memory which has become unnecessary in accordance with a command from the outside, and reassigning the data which has become unnecessary to a memory area assigned to a part of the logical address.

A memory system according to an aspect of the present invention comprising a nonvolatile memory; and a memory controller for performing control to extend the maximum value of a logical address by reassigning a memory area assigned to a part or the entirety of a logical address area in accordance with a command given thereto from the outside as logical address range information.

A host device according to an aspect of the present invention comprising a host device of a memory system formatted in an additional write file system, wherein a command to extend the maximum logical address range is issued to the memory system after deletion of a file, and a usable free memory area is recalculated on the basis of the value of the maximum logical address range after the extension.

BRIEF DESCRIPTION OF THE SEVERAL VIEWS OF THE DRAWING

FIG. 1 is a functional block diagram of a memory system;
FIG. 5 is a view showing a memory space formatted in accordance with the FAT file system;
FIG. 6 is a view showing an example of data held in the FAT;
FIG. 7 is a view showing a memory space formatted in accordance with the FAT file system;
FIG. 10 is a view showing the correspondences between the management data block, file data block, and write system;
FIG. 16 is a view showing the configuration by which the host acquires the highest level overwrite logical address;
FIG. 17 is a view showing the configuration by which the host acquires the highest level overwrite logical address;
FIG. 18 is a view showing an example of the detail of the register CSD;
FIG. 19 is a flowchart of initialization of a memory card;
FIG. 22 is a view showing a state at the time of the write processing of the memory card;
FIG. 23 is a flowchart of an assignment operation performed by the overwrite file system;
FIG. 27 is a view showing delivery of a free space extension command and a final assigned logical address.

DETAILED DESCRIPTION OF THE INVENTION

Figure 2:
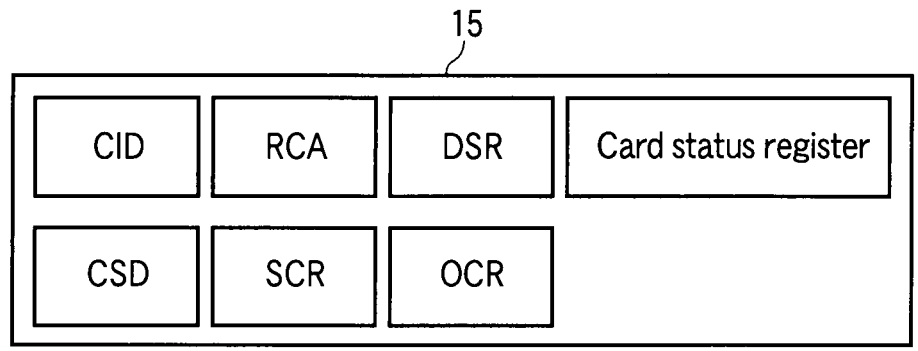
FIG. 2 is a view exemplifying the configuration of a register.

Embodiments of the present invention will be described below with reference to the accompanying drawings. It should be noted that common parts are denoted by the common reference symbols throughout all the drawings in the description. Further, it should be noted that the description will be given by taking a memory card and a host device thereof as examples of a memory system and a host device thereof according to the embodiment of the present invention.

First Embodiment

An Example in which the Memory Capacity is Increased After Deletion of a File

A first embodiment relates to an example of a memory system in which the memory capacity is increased after deletion of a file, and a host device thereof. Description will be given with reference to FIGS. 1 to 29 in the order of [1] configuration, [2] operation, and [3] effect.

[1] Configuration

[1-1] Overall Configuration

FIG. 1 is a functional block diagram schematically showing a main part of each of the memory system and the host device. Each functional block can be realized as one of the hardware and the computer software or a combination of both of them. Accordingly, each block will be described below generally in terms of the function in such a manner that it becomes clear that each block is the hardware, the computer software or a combination of both of them. It depends on the design restrictions imposed on the specific implementation aspect or the overall system whether such a function is executed as the hardware or the software. Those skilled in the art can realize the functions by various methods for each specific implementation aspect. However, determination of such realization is included in the category of the present invention.

In FIG. 1, the host device 1 is provided with the hardware and the software (system) for accessing a memory card 2 to be inserted thereinto. The host device 1 is provided with the software such as the application, the operating system, and the like. The software 3 is instructed by the user to write data onto the memory card 2, or read data from the memory card 2. The software 3 instructs the file system 4 to perform writing or reading of data.

The file system 4 is a mechanism for managing a file (data) recorded on a storage medium of an object to be managed, records management information on a storage area of the storage medium, and manages the file by using the management information. In the file system 4, a method of preparing directory information on the file, folder, and the like in the storage medium, a method of moving and a method of deleting a file, folder, and the like, a place of an area on which a recording system of data and management information are recorded, and a method, and the like of utilizing the place are fixed. The file system 4 is based on the FAT file system, is configured so that the system 4 can execute an operation according to this description, and the specific operation will be appropriately described.

The host device 1 includes an SD interface 5. The SD interface 5 is constituted of the hardware and the software necessary for performing interface processing between the host device 1 and the memory card 2 (controller 7). The host device 1 performs communication with the memory card 2 through the SD interface 5. The SD interface 5 stipulates various agreements necessary for the host device 1 and the memory card 2 to perform communication with each other, and is provided with sets of various commands which can be mutually recognized by an SD interface 11 of the memory card 2. Further, the SD interface 5 also includes a hardware configuration (arrangement, number, and the like of pins) which can be connected to the SD interface 11 of the memory card 2.

When the memory card 2 is connected to the host device 1 or when the host device 1 is turned on in a state where the memory card 2 is inserted in the host device 1 in an off state, the memory card 2 is supplied with power to be subjected to an initialization operation, and thereafter performs processing in accordance with access from the host device 1. The memory card 2 includes a memory controller 7 for controlling a memory (NAND flash memory) 6.

The memory 6 stores data therein in a nonvolatile manner, and performs data write and data read in units of so-called pages constituted of a plurality of memory cells. A physical address inherent in each page is assigned to each page. Further, the memory 6 performs data erasure in units of so-called physical blocks constituted of a plurality of pages.

The memory controller 7 manages the storage state of data of the memory 6. The management of the storage state implies management of a relationship between a page (or a physical block) of a certain physical address and data of a logical address assigned by the host device 1 held by the page, and a page (or a physical block) of a physical address in an erased state (state where nothing is written to the page or invalid data is held in the page).

The memory controller 7 includes the SD interface 11, a micro processing unit (MPU) 12, a read only memory (ROM) 13, a random access memory (RAM) 14, and a NAND interface 115.

The SD interface 11 is constituted of the hardware and the software necessary for performing interface processing between the host device 1 and the memory controller 7. The memory card 2 (memory controller 7) performs communication with the host device 1 through the SD interface 11. Like the SD interface 5, the SD interface 11 stipulates agreements that enable communication between the memory card 2 and the host device 1, is provided with sets of various commands, and includes a hardware configuration (arrangement, number, and the like of pins).

The SD interface 11 includes a register 15. The configuration of the register 15 is exemplified in FIG. 2. The register 15 includes various types of registers such as a card status register, CID, RCA, DSR, CSD, SCR, and OCR. The card status register is used in the normal operation, and, for example, error information is stored therein. The CID, RCA, DSR, CSD, SCR, and OCR are mainly used at the time of initialization of the memory card 2. In the card identification number (CID), the individual number of the memory card 2 is stored. In the relative card address (RCA), the relative card address is stored. In the driver stage register (DSR), the bus drive force and the like of the memory card 2 are stored. In the card specific data (CSD), the characteristic parameter value of the memory card 2 is stored. In the SD configuration data register (SCR), the data arrangement of the memory card 2 is stored. In the operation condition register (OCR), the operation voltage of the memory card 2 is stored when there is any restriction on the operation range voltage of the memory card 2.

The MPU 12 controls the overall operation of the memory card 2. For example, when the memory card 2 receives power supply, the MPU 12 reads out the firmware (control program) stored in the ROM 13 onto the RAM 14 to execute predetermined processing. The MPU 12 prepares various tables (to be described later) on the RAM 14 in accordance with the control program, receives a write command, read command, and erase command from the host device 1, and executes predetermined processing for the memory 6.

In the ROM 13, the control program and the like to be controlled by the MPU 12 are stored. The RAM 14 is used as a working area of the MPU 12, and stores the control program and various tables therein. In such tables, a conversion table (logical/physical table) of a physical address of a page actually storing data having a logical address assigned to the data by the file system 4 is included. The NAND interface 115 performs the interface processing between the memory controller 7 and the memory 6.

The storage area in the memory 6 is divided into a plurality of areas in accordance with the types of data items to be stored. The plurality of areas include a system data area 21, a confidential data area 22, a protection data area 23, and a user data area 24.

The system data area 21 is an area secured by the memory controller 7 in the memory 6 to store data necessary for the operation thereof, mainly stores therein management information relating to the memory card 2, and stores therein card information such as security information on the memory card 2, a medium ID, and the like. The confidential data area 22 stores therein key information used for encryption, and confidential data used at the time of authentication, and the host device 1 cannot access the area 22.

The protection data area 23 stores therein important data, and secure data. The host device 1 can access the protection data area 23, which is limited to after the validity of the host device is proved by the mutual authentication between the host device 1 and the memory card 2.

The host device 1 can freely access or use the user data area 24, in which user data such as an AV contents file, image data, and the like is stored. In the following description, it is assumed that the memory 6 denotes the user data area 24. It should be noted that the memory controller 7 secures a part of the user data area 24, and stores therein control data necessary for the operation of its own (a logical/physical table, final assigned logical block address to be described later, and the like). The protection data area 23 and the user data area 24 are logic-formatted by the host device 1 as another volume, and are file-managed.

[1-2] Configuration of Memory

Next, the configuration of the memory will be described below with reference to FIGS. 3 and 4.

[1-2-1] Physical Configuration of Memory Space and Memory

First, the configuration of the memory space of the memory 6 will be described below with reference to FIG. 3. FIG. 3 is a view showing the configuration of the memory space of the memory 6.

Figure 3:
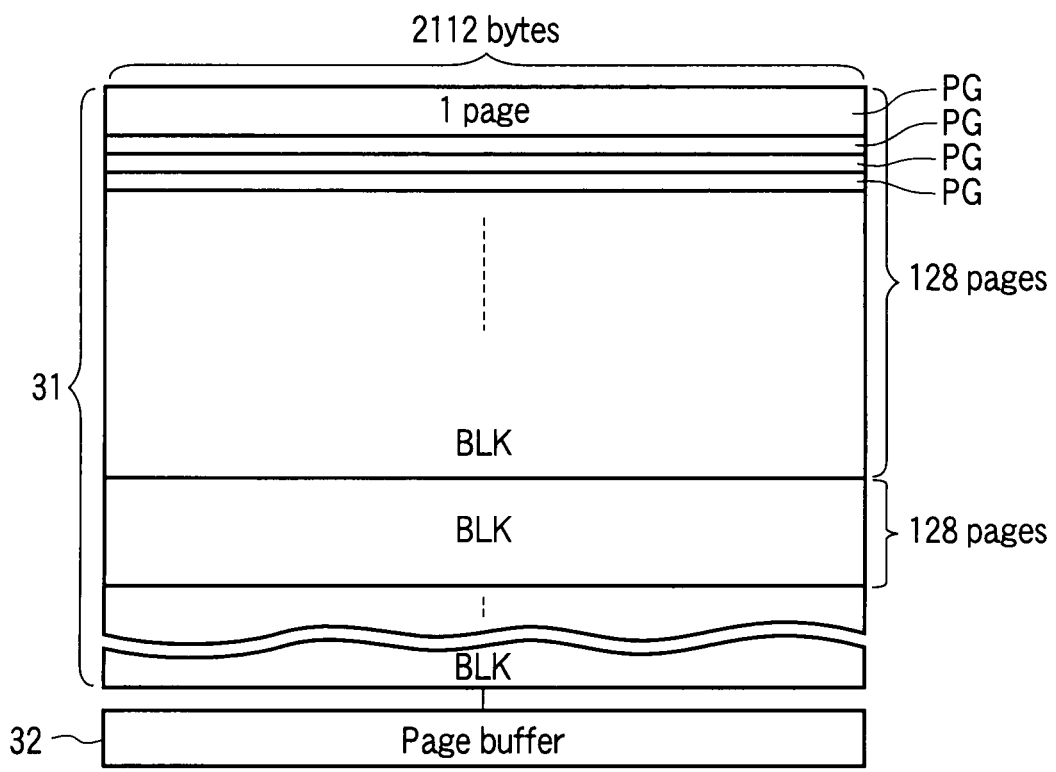
FIG. 3 is a view showing the configuration of a memory space of a memory.
Figure 4:
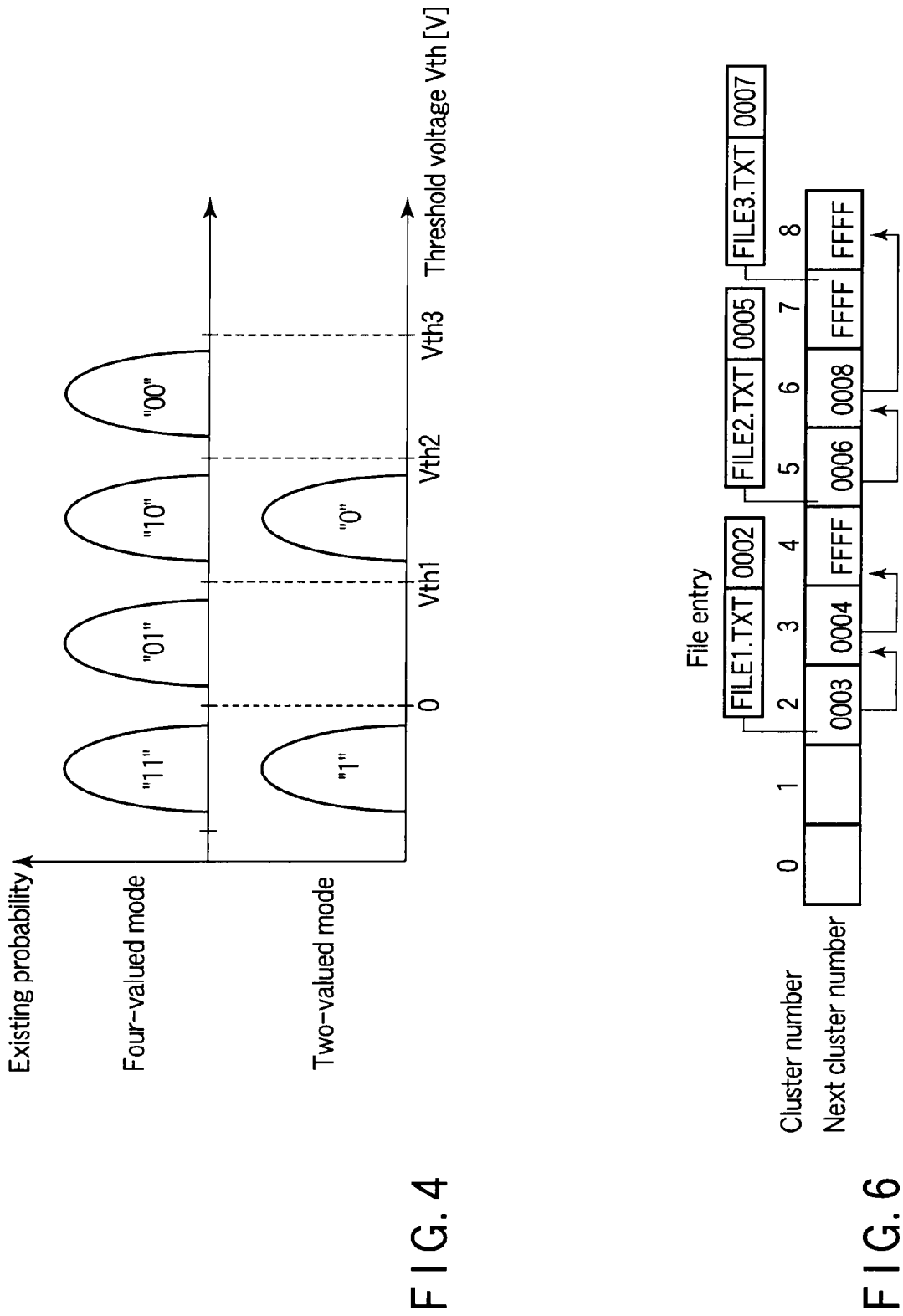
FIG. 4 is a view showing a two-valued mode and a multiple-valued mode.

As shown in FIG. 3, the memory 6 includes a normal memory area 31 and a page buffer 32.

The memory area 31 includes a plurality of blocks BLK. Each physical block BLK is constituted of a plurality of pages PG. Each page PG includes a plurality of memory cell transistors connected in series.

Each memory cell is constituted of a metal oxide semiconductor field effect transistor (MOSFET) of a so-called stacked gate structure. The stacked gate MOS transistor includes a tunnel insulating film, a floating gate electrode, an inter-electrode insulating film, a control gate electrode, and a source/drain diffused layer. In each memory cell transistor, the threshold voltage is changed in accordance with the number of electrons stored in the floating gate electrode, and the memory cell transistor stores therein information corresponding to the value of the threshold voltage. The memory cell transistor can take different states of two or more threshold voltages, and has a configuration capable of storing so-called multiple values. Further, the control circuit including a sense amplifier of the memory 6, a potential generation circuit, and the like has a configuration capable of writing data of multiple bits to the memory cell transistor, and reading out data of multiple bits.

Control gate electrodes of memory cell transistors belonging to the same row are connected to the same word line. At both ends of memory cell transistors belonging to the same column and connected in series, selection gate transistors are provided. One of the selection transistors is connected to the bit line. In accordance with this rule, memory cell transistors, selection gate transistors, word lines, and bit lines are provided. Writing or reading of data is performed for each aggregate of a plurality of memory cell transistors, and a storage area constituted of the aggregate of the memory cell transistors corresponds to one page.

In the case of FIG. 3, each page PG has 2112 bytes (data recording section of 512 bytes×4+redundant section of 10 bytes×4+management data storage section of 24 bytes), and each block BLK is constituted of, for example, 128 pages.

The page buffer 32 performs data input/output to/from the memory 6, and temporarily stores data therein. The size of data which can be held by the page buffer is, for example, 2112 bytes (2048 bytes+64 bytes) which is identical with the size of the page PG. At the time of data write or the like, the page buffer 32 executes data input/output processing with respect to the memory 6 in units of 1 page corresponding to the storage capacity of its own. Erasure of data is performed in units of physical blocks BLK.

Further, the memory 6 has a mode in which data of one bit is written to one memory cell transistor, and a mode in which data of multiple bits, i.e., data of a value of $2^n$ is written to one memory cell transistor. The mode in which one bit data is written to one memory cell transistor of the memory 6 is called a two-valued mode, and the mode in which multiple bit data is written to one memory cell transistor is called a multiple-valued mode.

[1-2-2] Write Mode of Memory

Next, the two-valued mode, and the multiple-valued mode will be described below with reference to FIG. 4. FIG. 4 is a view showing the difference between the two-valued mode and the multiple-valued mode. As described above, each memory cell transistor of the memory 6 can store data of two or more bits. That is, each memory cell transistor can store a value of $2^n$ (n is a natural number). However, in the following description, the four-valued mode will be described as an example of the multiple-valued mode. In FIG. 4, the abscissa indicates the threshold voltage Vth, and the ordinate indicates the existing probability of the memory cell.

First, the four-valued mode will be described. As shown in FIG. 4, the memory cell transistor can store one of four data items, for example, in the ascendant order from the lower threshold voltage, "11", "01", "10", and "00" in accordance with the value of the threshold voltage Vth. The threshold voltage Vth [V] of the memory cell transistor storing the data "11" is in the state of Vth<1. The threshold voltage Vth [V] of the memory cell transistor storing the data "01" is in the state of 0<Vth<Vth1. The threshold voltage Vth [V] of the memory cell transistor storing the data "10" is in the state of Vth1<Vth<Vth2. The threshold voltage Vth [V] of the memory cell transistor storing the data "00" is in the state of Vth2<Vth<Vth3.

Next, the two-valued mode will be described. As shown in FIG. 4, the memory cell transistor can store one of two data items in the ascendant order from the lower threshold voltage, "1" and "0" in accordance with the value of the threshold voltage Vth. The threshold voltage Vth [V] of the memory cell transistor storing the data "1" is in the state of Vth<0. The threshold voltage Vth [V] of the memory cell transistor storing the data "0" is in the state of Vth1<Vth<Vth2.

The data "1" has a threshold voltage identical with the data "11" in the four-valued mode, and the data "0" has a threshold voltage identical with the data "10" in the four-valued mode. That is, it can be said that the two-valued mode is an operation mode in which only lower level bits of the two-bit data in the four-valued mode are used. Whether the memory 6 writes data to the memory cell transistors in the two-valued mode or in the four-valued mode is determined in accordance with the instruction of the memory controller 7. More specifically, lower page addresses are assigned to the lower bits of the two-bit data, and upper page addresses are assigned to the upper bits. When data is written to the memory cell transistors in the two-valued mode, the memory controller 7 writes data to the memory 6 by using only lower level page addresses of the page addresses. When data is written to the memory cell transistors in the multiple-valued mode, the memory controller 7 writes data to the memory 6 by using both the upper level page addresses and the lower level page addresses.

First, data write is started at the lower level bits. Assuming that the erased state is "11", "0" or "1" is first written to the lower level bits, whereby the memory cell transistor is brought into a state where the transistor holds "11" ("−1") or "10" ("−0"). Here, "−" implies an indefinite state. In the case of the two-valued mode, data write is completed here.

On the other hand, in the case where data is written in the four-valued mode, "0" or "1" is subsequently written to the upper level bits. As a result of this, the memory cell transistor that has been holding "11" ("−1") is brought into a state where the transistor holds "11" or "01", and the memory cell transistor that has been holding "10" ("−0") is brought into a state where the transistor holds "10" or "00". The same applies to other modes such as the eight-valued mode, sixteen-valued mode, and the like.

In the multiple-valued mode, although the data storage amount per memory cell is large, the writing speed is low. On the other hand, in the two-valued mode, although the data storage amount per memory cell is small, the writing speed is high, and the tolerance to the rewriting frequency is also high.

In the memory 6, writing in the two-valued mode or writing in the multiple-valued mode can be selected for each physical block.

It should be noted that in addition to the four-valued mode, extension such as the eight-valued (three bits per memory cell) mode and sixteen-valued (four bits per memory cell) mode can also be considered. In any case, the smaller the number of bits per memory cell is, the higher the writing speed is and the tolerance to rewriting frequency is.

[1-2-3] Format of Memory

Next, the format of the memory card 2 will be described below. The memory 6 is formatted in the following form. The formatting is performed by the file system (for example, the file system 4 in the host device 1) according to an embodiment of the present invention.

[1-2-3-1] FAT File System

Prior to the description of the format of the memory 6 by the file system according to an embodiment of the present invention, an outline of the FAT file system on which the file system is based will be described below with reference to FIGS. 5 and 6. FIG. 5 shows a state of the memory space formatted by the FAT file system. Further, some of the management data items shown below are written. The memory space mentioned herein is a memory area which can be freely accessed by the FAT file system, and coincides with the user data area 24 in the memory 6 of FIG. 1.

As shown in FIG. 5, the FAT file system manages the memory which is a management object by dividing the memory space of the memory into clusters of a predetermined size (for example, 16 Kbytes). Management data items are assigned to an area from the lowest level to a cluster number of a predetermined range of the memory space 40. Hereinafter, an area in which management data is stored is called a management data block 41. To the areas of cluster numbers higher than the management data block 41, file data are assigned. Hereinafter, areas in which file data are stored are called a file data block 42.

The management data block 41 is further divided into an area 43 assigned to a partition table, an area 44 assigned to a boot sector, areas 45 and 46 assigned to FAT1 and FAT2, and an area 47 assigned to a root directory entry. In the partition table, information such as a file system type of each partition, and a leading sector thereof is stored. The boot sector is positioned at the leading sector indicated by the partition table, and includes a BIOS parameter block (BPB). The BPB indicates various parameters of the memory 6 used by the file system. When the memory is formatted, the FAT file system writes the parameter. The FAT file system reads the BPB at the time of activation, thereby recognizing the parameter of the file format.

The FAT1 indicates in which cluster a part of file data written to the memory and divided into sizes of clusters (hereinafter simply referred to as file data) is stored, and connections between clusters for restoring the file data. The FAT2 is a backup of the FAT1, and the same contents as the FAT1 are stored therein. It is not essential that file data items constituting one file be assigned to consecutive clusters, and hence the FAT file system assigns empty clusters at random to the file data items irrespectively of the order of the cluster numbers. Further, in the FAT1 and FAT2, connection relationships between clusters in which file data is stored are stored. By tracing the information stored in the FAT1 and FAT2 (hereinafter simply described as FAT), the original file is restored.

The root directory entry stores therein a file entry of each file belonging to a root directory. In the file entry, a file name or a folder name, a file size, attribute information and update date and time information, a flag indicating which cluster is the leading cluster of a file, and the like are included. It should be noted that depending on the version (for example, FAT16 and FAT32) of the FAT format type, it is possible to place the root directory entry at an arbitrary address after the FAT.

When a file belongs to a subdirectory belonging to a root directory, in the root directory entry, the number of a cluster assigned to an entry (subdirectory entry) of the subdirectory belonging to the root directory is described. Further, the subdirectory entry holds a file entry of each file belonging to itself. As shown in FIG. 5, the subdirectory entry is written to an arbitrary cluster 48 in the file data block 42 by the FAT file system. The subdirectory entry also belongs to the management data, and is frequently rewritten in many cases. FIG. 6 shows examples of the FAT and file entry. As shown in FIG. 6, in the root directory entry, position information on the leading cluster of each of files "FILE1.txt", "FILE2.txt", and "FILE3.txt" is stored. The leading clusters of the files "FILE1.txt", "FILE2.txt", and "FILE3.txt" are 0002, 0005, and 0007, respectively.

In the FAT, numbers of clusters to be connected to the respective clusters are described. For example, in the case of "FILE1.txt", it can be seen that a cluster storing therein data subsequent to the data of the leading cluster 0002 is the cluster 0003, and a cluster storing therein data subsequent to the data of the cluster 0003 is the cluster 0004. Further, by connecting the data items of the clusters 0002, 0003, and 0004 to each other, the file of "FILE1.txt" is restored. To the cluster storing therein the last part of the file data, "FFFF" is written.

[1-2-3-2] FAT File System

A file system according to the embodiment of the present invention, and based on the FAT file system will be described below with reference to FIG. 7. The file system (hereinafter it is assumed that the file system 4 in the host device 1 also corresponds thereto) according to the embodiment of the present invention formats the memory space of the storage medium in the following form. Further, the memory card 2 is formatted by the file system 4.

FIG. 7 shows the memory space formatted by the file system 4 according to the embodiment of the present invention. The memory space 50 of FIG. 7 coincides with the area of the storage area of the storage medium which is the object to be formatted, the area being an area that can be used by the file system 4.

As shown in FIG. 7, the file system 4 restricts an area to which management data used by the file system 4 to manage the file data is assigned to addresses from the lowest level logical address to a logical address in a predetermined range. That is, only the logical addresses within the predetermined range are assigned to the management data. Here, in the management data, the partition table, boot sector, FAT1, FAT2, root directory entry, and subdirectory entry which are identical with those used in the FAT file system are included.

In the block (management data block 51) in which the management data is stored, an area 53 assigned to the partition table, an area 54 assigned to the boot sector, areas 55 and 56 which are assigned to FAT1 and FAT2, an area 57 assigned to the root directory entry, and an area 58 assigned to the subdirectory entry are included. Data to be stored in the blocks 53 to 58 is the same as that defined in the conventional FAT file system.

The part of the memory space excluding the management data block 51 is the file data block 52 exclusively used for writing of file data. The capacity of the management data block 51 is determined in consideration of the size of the memory space 50, and the size of file data block 52 demanded to be secured. For example, the capacity of each of the partition table area 53, boot sector area 54, FAT1 area 55, FAT2 area 56, root directory entry area 57, and subdirectory entry area 58 is 121.5 kB, 0.5 kB, 123 kB, 123 kB, 16 kB, and 64 kB. The capacity of the file data block 52 is 1005632 kB.

It should be noted that the file system 4 is based on the FAT file system (irrespectively of a difference between FAT16 and FAT32 and the like). Further, not only the FAT file system, but also a similar file system including the extension of the FAT can be utilized. For example, a file system in which file data is managed by using management data, and the management data is frequently rewritten corresponds to the above file system.

[1-2-3-3] UDF File System

Next, the UDF file system (additional write file system) according to the embodiment of the present invention will be described below with reference to FIGS. 8 and 9. The file system according to this example formats the memory space of the storage medium in the form shown below. Further, the memory card 2 is formatted by the file system 4.

Figures 8, 9:
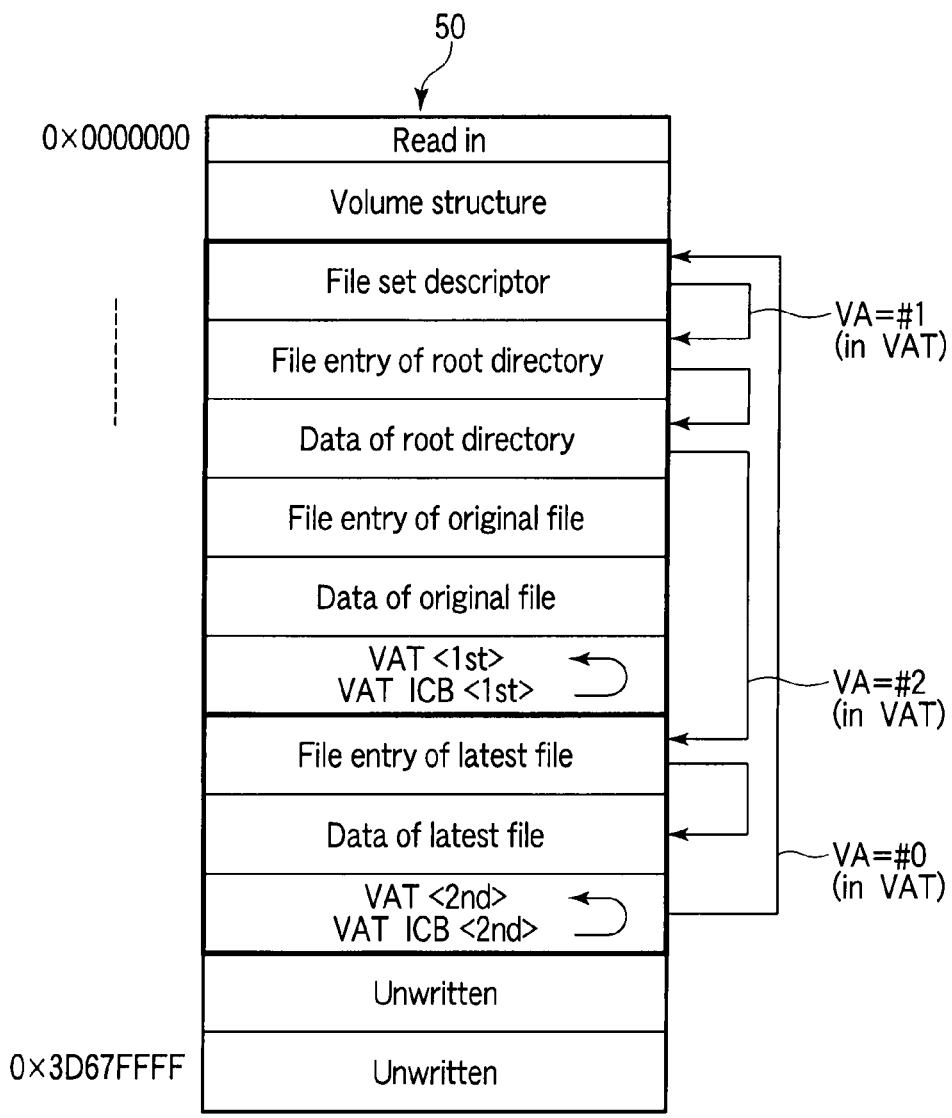
FIG. 8 is a view showing a memory space formatted in accordance with the UDF file system.
FIG. 9 is a view showing an example of the VAT.

In FIG. 8, the file structure recognized by the file system in the case where, for example, a DVD-R file system is applied to the memory card is schematically shown. As shown in FIG. 8, the memory space 50 coincides with an area of the storage area of the storage medium which is the object to be formatted, the area being able to be used by the file system 4, and is formatted by the additional write file system. In other words, the memory space 50 is formatted by the UDF additional write file system which is a genuine additional write file system.

When instructed to write data to an address identical in size with or smaller than an address of data formerly written, the memory controller 7 performs control to return a write protect error to the host device 1 (outside). That is, as for data to which a logical address belonging to the file data block 50 shown in FIG. 8 is assigned, overwrite is inhibited, and only additional write is permitted. The memory controller 7 accepts a write request only when a logical address higher in level than a logical address that has already been assigned is assigned. With respect to a write request that does not agree with the above condition, the memory controller 7 does not perform the write, and transmits a status indicating a write protect error to the host device 1. Further, FIG. 8 shows a state where a file has been subjected once to update, deletion, and addition.

As shown in FIG. 8, in the order from above the sector number (0x0000000), the volume structure, file set descriptor, file entry of a root directory, and data of a root directory are arranged in sequence. Subsequently, the file entry of the file (original file) that has been described for the first time, i.e., the file entry of the file before the addition and deletion is arranged. Then, the data of the original file is arranged. Then, VAT (VAT<1st>) prepared at the time of the first description, and then ICB of VAT of the first time is arranged.

Next, the file entry of the updated file, and the updated file are arranged. Further, VAT (VAT<2nd>) prepared at the time of the update, and ICB of VAT at the time of the update are arranged. After this, unwritten areas are arranged.

FIG. 9 shows an example of VAT<2nd>. As shown in FIG. 9, virtual addresses and logical addresses are correlated with each other.

When the data of the file is read out, the file system reads out the latest VAT ICB. As described above VAT ICB is arranged at the rearmost part of the write area at all times, and in the case of the example of FIG. 8, VAT ICB<2nd> is accessed.

The file system refers to the position of the latest VAT described in VAT ICB<2nd>, and then reads out VAT. Subsequently, the file system accesses the file set descriptor. At this time, the logical address of the file set descriptor is obtained from the virtual address #0 by using VAT.

Next, the file system reads out the file entry of the root directory from the address described in the file set descriptor. Actually, the file system reads out ICB, and then accesses the address of the file entry described in ICB.

Subsequently, the file system accesses data of the root directory by using the virtual address #1 described in the file entry of the root directory and VAT. Then, the file system accesses ICB of the latest file from the virtual address described in the data of the root directory, and accesses the file entry of the latest file by using the virtual address #2 described in this ICB and VAT. Further, the data of the latest file is read out from the address described in the file entry.

[1-2-4] Relationship Among Management Data, File Data Block, and Write System in File System 4

Next, the relationship among the management data block 51, file data block 52, and write system will be described below with reference to FIG. 10.

FIG. 10 is a view showing the correlations among the management data block 51, file data block 52, and write system. As shown in FIG. 10, when requested to update a logical address belonging to the management data block 51, the memory controller 7 performs overwrite. Here, "overwrite" implies a write system that enables a logical address to which data has already been assigned to be assigned to the other data. Hereinafter, a logical address belonging to the management data block 51 will be referred to as an overwrite logical address. It should be noted that the memory 6 is a NAND flash memory, and hence data which has already been written cannot be rewritten. Thus, the following configuration called a cache physical block (cache block) can be used as the need arises.

Data to which an overwrite logical address is assigned is the management data, and is frequently updated. In order to perform quick writing for the frequent update, a block dedicated to additional write called a cache block may be provided in the memory 6. The cache block is provided in addition to the physical block (original block) to which data of each logical address is naturally written.

Data of a predetermined logical address are written to the same original block. Each time an update request of data that has already been written to the original block is received, the data is written to an empty page in the cache block in sequence from the lower level physical address to the higher level physical address. At this time, the memory card 2 prepares a correspondence table indicating the page of the cache block to which the latest data of a certain logical address is written. Accordingly, even when an update request frequently occurs at a certain logical address, quick writing can be realized without performing relocation processing. When the cache block is used, that is, as for the overwrite logical address, the correspondence between a logical address of one sector and a physical address of one page is managed.

When the amount of file data is small, an overwrite logical address can also be assigned to the file data.

On the other hand, as for data to which a logical address belonging to the file data block 52 is assigned, the memory controller 7 inhibits overwrite, and permits only additional write. The term "additional write" implies a system for assigning only a logical address of a higher level than a logical address to which data has already been assigned to write data. That is, the memory controller 7 accepts a write request only when a logical address higher in level than a logical address that has already been assigned is assigned. With respect to a write request that does not agree with the above condition, the memory controller 7 does not perform the write, and transmits a status indicating a write protect error to the host device 1. Hereinafter, a logical address belonging to the file data block 52 will be referred to as an additional write logical address.

As for data to which an additional write logical address is assigned, one physical block is assigned to a collection (called a logical block) of a plurality of logical addresses of a predetermined number. Therefore, as for the additional write logical address, the correspondence between the address (assigned to each logical block) of the logical block and the address of the physical block is managed. The logical block has, for example, the same size as the physical block.

When the file data is updated, the file system 10 requests the memory card 2 to write file data to which a logical address higher in level than the logical address that has already been assigned is assigned, and update the management data.

Information indicating a range of the overwrite logical address, for example, an overwrite logical address of the highest level is written to the system data area 21. The information of the highest level overwrite logical address is written, for example, when the memory card 2 is formatted. It is also possible to indicate the border between the overwrite logical address and the additional write logical address by using the additional write logical address of the lowest level.

[1-2-5] Correspondence Between Write System and Write Mode

Figure 11:
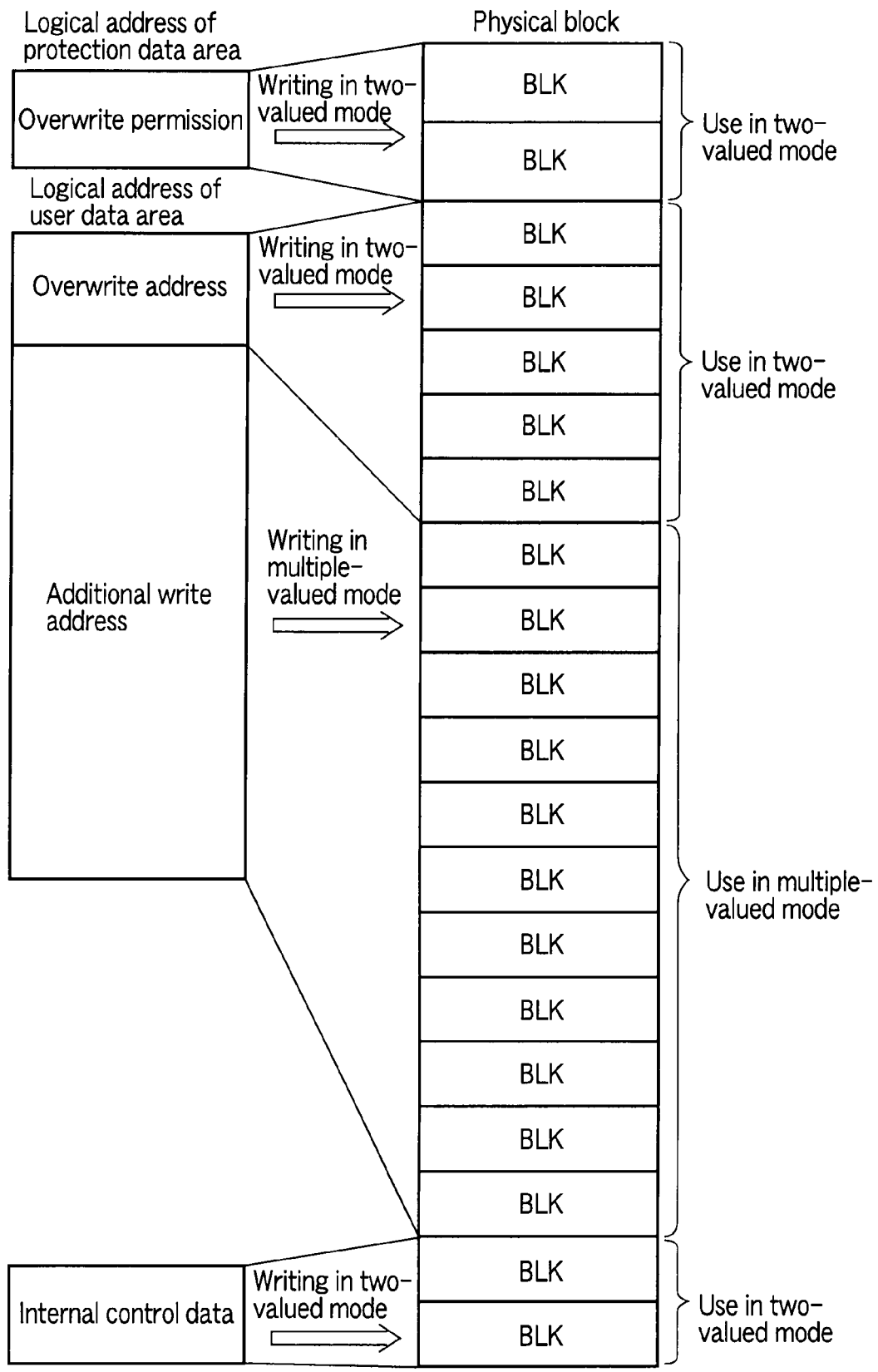
FIG. 11 is a view showing the correspondence between the write system of the controller and the write mode.

Next, the correspondence between the write system and the write mode will be described below with reference to FIG. 11. FIG. 11 shows the correspondence between the write system and the write mode of the memory controller according to the embodiment of the present invention.

As shown in FIG. 11, the memory controller 7 can write the write data to which an overwrite logical address is assigned to the memory 6 in the two-valued mode, and can write the write data to which an additional write logical address is assigned to the memory 6 in the multiple-valued mode. Accordingly, the management data having a small amount, and frequently requested to be updated is written in the two-valued mode having a small capacity, enabling high-speed writing, and having high tolerance to rewriting frequency, and the file data having a large amount is written in the multiple-valued mode having a large capacity, and having a low writing speed. By selecting a write mode in accordance with the property of the data as described above, it is possible to secure a large storage capacity while writing data to the memory card 2 at a high speed. As more general description, it is possible to write management data so that one memory cell can store therein data of m (m is an integer equal to one or larger) bits, and write file data so that one memory cell can store therein data of n (n is an integer larger than m) bits.

The physical blocks may be classified into those used for the two-valued mode writing, and those used for the multiple-valued mode writing. More specifically, the memory controller 7 can use the physical blocks included in the range from the lowest level physical address to a predetermined border for the writing in the two-valued mode, and use the physical blocks included in the range from the border to the highest level physical address for the writing in the multiple-valued mode.

At the time of the writing in the multiple-valued mode, it is also possible to use a physical block for the two-valued mode as the buffer 32. Further, as described above, the memory controller 7 writes control data to the user data area 24. The memory controller 7 can also write this control data to the physical block in the two-valued mode, and can perform overwrite.

Further, as described above, the protection data area 23 and the user data area 24 are logic-formatted by the host device 1 as another volume. Further, in general the protection data area 23 has a small capacity, and file data written to the protection data area 23 is frequently updated. Therefore, the memory controller 7 is permitted to write data to the protection data area 23 in the two-valued mode, and perform overwrite.

It should be noted that a configuration in which the protection data area 23 and the user data area 24 do not belong to another volume, and the protection data area 23 and the user data area 24 belong to partitions different from each other can also be considered. In this case, it is possible to use a method by which one of the conventional file system permitting all the data to be overwritten, and the file system according to the embodiment of the present invention permitting only the management data to be overwritten can be applied to each partition.

[1-3] Configuration of SD Interface

Next, the configuration of the SD interface will be described below with reference to FIGS. 12 to 18.

[1-3-1] Method for Delivering Final Assigned Logical Address

Figure 12:
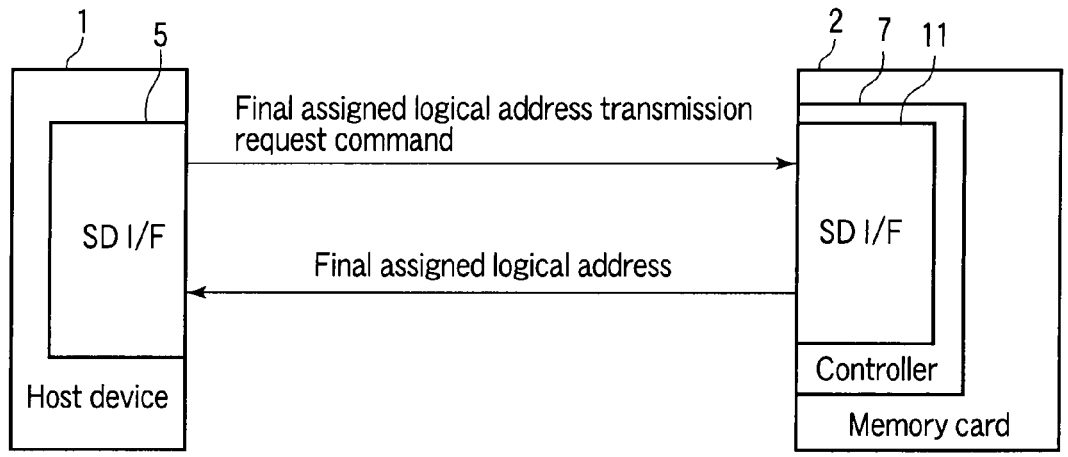
FIG. 12 is a view showing the configuration for delivering the final allocated logical address.
Figure 13:
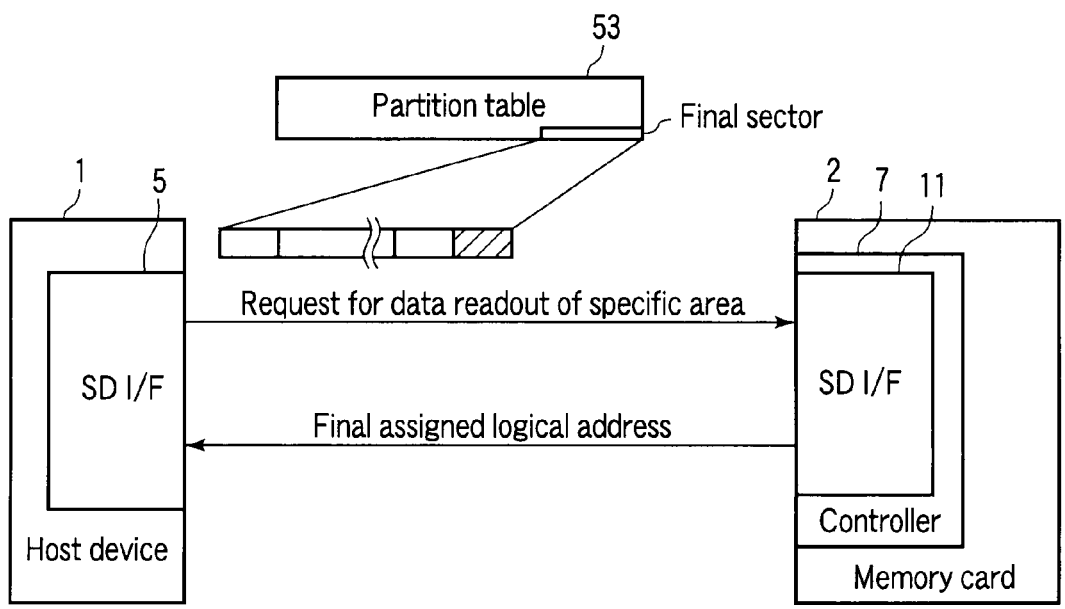
FIG. 13 is a view showing the configuration for delivering the final allocated logical address.

In order to write file data in the additional write system, it is necessary for the host device 1 (file system 4) to acquire the finally assigned logical address (final assigned logical address). Thus, a command for delivering the final assigned logical address is provided in the SD interfaces 5 and 11. FIGS. 12 and 13 are views each showing the configuration for delivering the final assigned logical address.

As will be described later, the memory controller 7 writes a logical address finally assigned at the time of the writing to the RAM 14.

As shown in FIG. 12, the host device 1 issues a command to transmit the final assigned logical address thereto to the memory controller 7. Upon receipt of the command, the memory controller 7 transmits the final assigned logical address stored in the RAM 14 to the host device 1 as a response. The host device 1 acquires the final assigned logical address by the response. Further, the host device 1 starts assignment from a logical address subsequent to this logical address, whereby the host device 1 can additionally write data to the memory card 2.

Further, in place of providing the dedicated command, the following method can be used. That is, upon receipt of a request for readout of a specific logical address, the memory controller 7 transmits the final assigned logical address to the host device 1 as the readout data as shown in FIG. 13. It is possible to make, for example, the last eight bytes in the last sector of the partition table block 53 the specific logical address. By this method, even when the memory card 2 is used through a universal serial bus (USB) reader/writer (RW) of the conventional specification that does not support the new command, it becomes possible to read out data from the memory card 2 of the final written logical address by using the software on the personal computer (PC) in which the USB RW is inserted.

[1-3-2] Method for Performing Authentication of Permission for Data Writing

Figure 14:
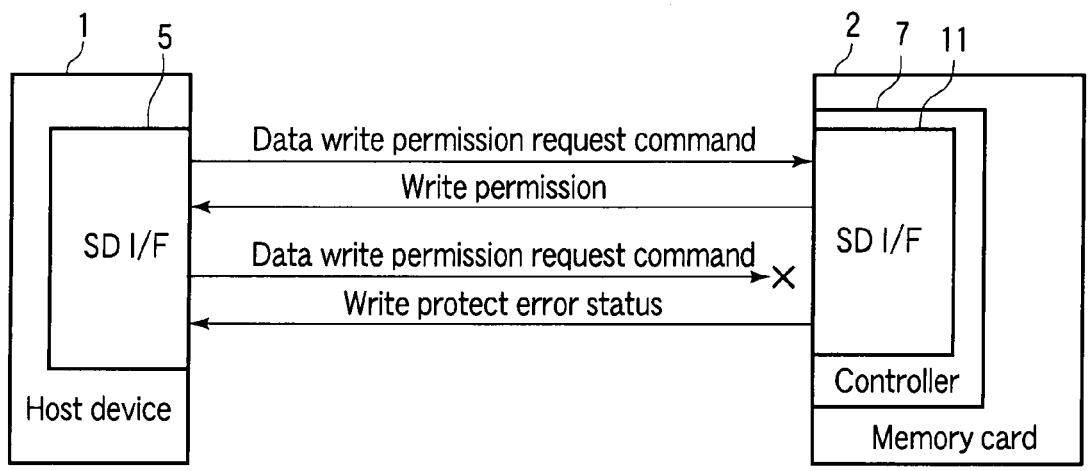
FIG. 14 is a view showing the configuration for performing authentication of data write permission.
Figure 15:
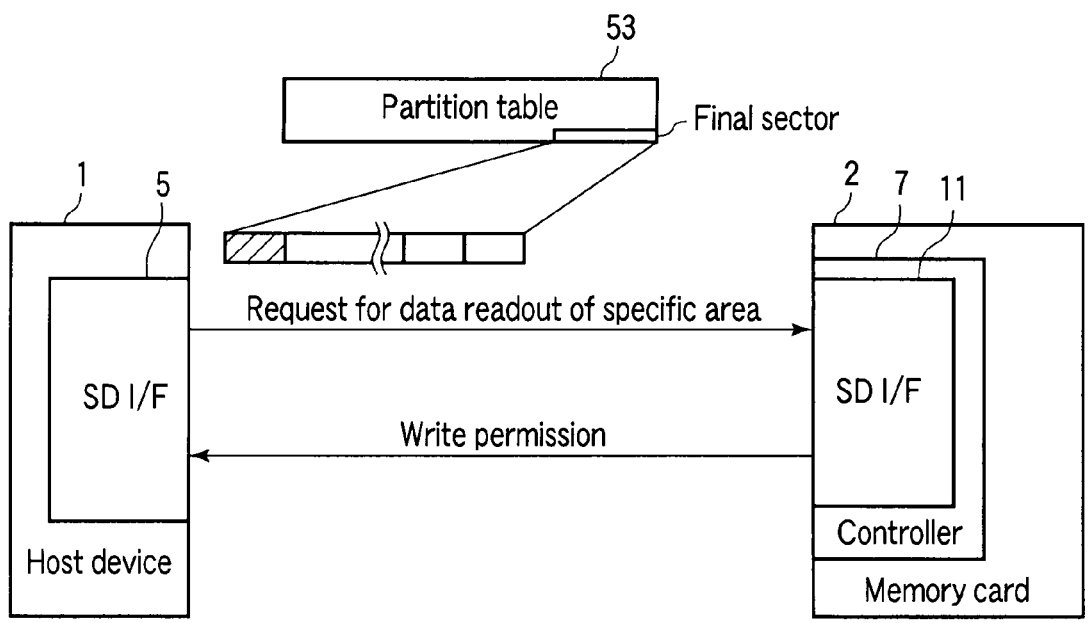
FIG. 15 is a view showing the configuration for performing authentication of data write permission.

When data is written to the memory card 2 according to the embodiment of the present invention through a conventional file system, a mismatch occurs in the management data. As a result of this, there is the possibility of the file contents being broken. Thus, a command to perform authentication of writing data to the memory card 2 is provided in the SD interfaces 5 and 11. FIGS. 14 and 15 are views each showing the configuration for performing authentication of permission for data writing.

As shown in FIG. 14, the memory controller 7 waits for, after the initialization, transmission of a data write permission request command from the host device 1. When the memory controller 7 receives this command, the host device 1 supports this command, i.e., the host device 1 incorporates therein the file system 4 according to the embodiment of the present invention, and hence the memory card 2 accepts the write request.

On the other hand, when the data write permission request command is not received, the memory controller 7 returns a write protect error signal to the host device 1 at all times in response to a write request from the host device 1.

By virtue of this technique, the data of the memory card 2 is prevented from being broken by a file system which is not the file system 4 according to the embodiment of the present invention.

Further, in place of providing the dedicated command, the following method can be used. That is, as shown in FIG. 15, when the memory controller 7 receives, from a certain host device, a request to write specific data to a specific logical address, the memory card 2 thereafter accepts a write request from this host device. It is possible to make, for example, the first eight bytes in the last sector of the partition table block 53 the specific logical address. It is possible to make, for example, at least one of 0x01, 0x23, 0x45, 0x67, 0x89, 0xAB, 0xCD, and 0xEF the specific data. By this method, even when the memory card 2 is used through a USB RW of the conventional specification that does not support the new command, it becomes possible to write data to the memory card 2 by using the software on the PC in which the USB RW is inserted.

[1-3-3] Method by which Host Device Acquires Range of Overwrite Logical Address

It is necessary for the host device 1 (file system 4) to acquire the border between the overwrite logical address and the additional write logical address. Thus, a command to deliver the highest level overwrite logical address is provided in the SD interfaces 5 and 11. FIGS. 16 and 17 are views each showing the configuration by which the host device acquires the highest level overwrite logical address. It should be noted that it is also possible to perform the following processing by using, as a method of indicating the border between the overwrite logical address and the additional write logical address, the lowest level additional write logical address in place of the highest level overwrite logical address.

As shown in FIG. 16, the host device 1 issues a command to transmit thereto the highest level overwrite logical address to the memory controller 7. Upon receipt of the command, the memory controller 7 transmits the highest level overwrite logical address stored in the system data area 21 to the host device 1 as a response.

The host device 1 can learn the range of the overwrite logical address by using this command. The file system 10 of the host device 1 refers to the highest level overwrite logical address, and prepares a logical address lower in level than this address, i.e., prepares a new file or directory entry at the overwrite logical address.

Further, the following method can be used in place of providing the dedicated command. That is, as shown in FIG. 17, upon receipt of a request for readout of a specific logical address, the memory controller 7 transmits the highest level overwrite logical address to the host device 1 as the readout data as shown in FIG. 17. It is possible to make, for example, the second last eight bytes in the last sector of the partition table block 53 the specific logical address. By this method, even when the memory card 2 is used through a USB RW of the conventional specification that does not support the new command, it becomes possible to read out data from the memory card 2 of the highest level overwrite logical address by using the software on the PC in which the USB RW is inserted.

[1-3-4] Card Type Flag

A flag indicating the type of the memory card 2, and the write system corresponding to the type is described in the register CSD of the register 15. FIG. 18 shows an example of the details of the register CSD.

As shown in FIG. 18, in addition to the area previously defined in CSD (using an undefined area), three areas are defined. An example in which 0th to fourth bits are regarded as being already defined, bits to be newly defined CT, OW, and FC are provided in the fifth, sixth, and seventh bits is shown.

The bit CT (register CT) is indicative of a restriction on assignment of a logical address to the management data. For example, "0" is indicative that any logical address may be assigned to the management data (particularly, directory entry) at the time of writing data to the memory card 2. On the other hand, for example, "1" is indicative that a logical address in the predetermined range must be assigned to the management data as in the case of the embodiment of the present invention.

The bit OW (register OW) is indicative of a restriction on overwrite of file data. For example, "0" is indicative that no restriction is imposed on overwrite of file data. On the other hand, for example, "1" is indicative that overwrite is not permitted (only additional write is permitted) with respect to a part of the logical addresses as in the case of the embodiment of the present invention.

The bit FC (register FC) is indicative of presence/absence of the possibility of the memory card 2 rewriting FAT. Depending on the memory controller, from the characteristics of the operation, after writing of file data, the memory controller rewrites FAT by itself in some cases. In this case, it is necessary for the file system of the host device to perform the processing of reading out FAT after data writing. Thus, the register FC is provided so that the file system of the host device can learn whether or not FAT should be read out. For example, "0" is indicative that the memory card 2 does not rewrite FAT (file system need not read out FAT again). On the other hand, for example, "1" is indicative that the memory card 2 may sometimes rewrite FAT (file system needs to read out FAT again).

In the memory card 2 according to the embodiment of the present invention, CT=1, OW=1, and FC=0.

By providing the bits described above, it is easily possible for the file system to grasp the characteristics of the memory card 2.

[2] Operation

Next, operations of the host device 1 and the memory card 2 will be described with reference to FIGS. 19 to 23.

[2-1] Initialization of Memory Card

Next, an operation of initialization of the memory card 2 will be described below with reference to FIG. 19. FIG. 19 is a flowchart of initialization of the memory card according to the embodiment of the present invention.

The memory controller 7 appropriately writes some items of information to the memory 6 in order to grasp to which additional write logical address data have already been assigned during the initialization processing. For example, when file data to which an additional write logical address is assigned is written, the memory controller 7 writes a flag indicative that data has already written to the address to a redundant area of each page in addition to writing of the file data. Further, an address of the logical block including the finally assigned logical address is stored in the system data area 21.

As shown in FIG. 19, at the start of the supply of power, when the initialization command is received, the memory controller 7 starts the initialization processing. The initialization processing S1 is constituted of initialization processing (step S1a) identical with that of the conventional memory card, and processing (steps S1b to S1d) of calculating the final logical address of the additional write logical addresses that have already been assigned, and writing the logical address to the RAM 14.

As for the additional write logical address, only the correspondence between the logical block and the physical block is managed, and hence the finally assigned one logical address is identified by the following method. First, in step S1b, the memory controller 7 acquires the address (final assigned logical block address) of the logical block including the finally assigned logical address from the system data area 21.

Then, in step S1c, the memory controller 7 inspects the redundant area of each page in the physical block (final written physical block) assigned to the final assigned logical block to acquire the physical address of the finally written page. As a result of this, the memory controller 7, acquires the number of already written pages in the final written physical block. Then, in step S1d, the memory controller 7 acquires the logical address that has been finally assigned by means of (number of all logical blocks lower in level than final written logical block address×number of logical addresses per logical block+number of written pages in final written physical block). Then, in step S5, the memory controller 7 writes the finally assigned logical address (final assigned logical address) to the RAM 14.

[2-2] Write

Figure 20:
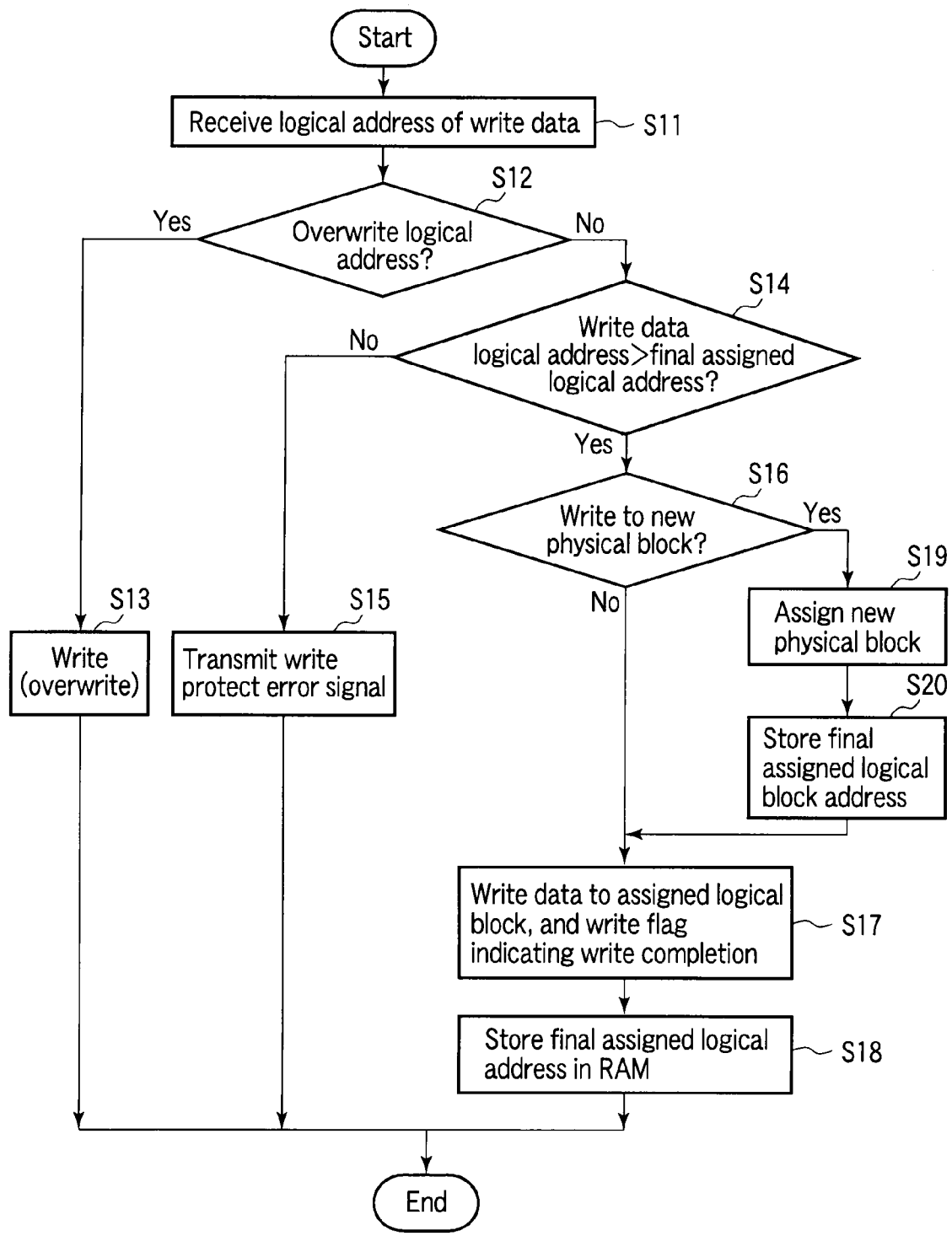
FIG. 20 is a flowchart of a write operation performed in the memory card.

Next, a write operation in the memory card 2 will be described below with reference to FIG. 20. FIG. 20 is a flowchart of the write operation in the memory card according to the embodiment of the present invention.

As shown in FIG. 20, in step S11, the memory controller 7 receives a write command and write data to which a logical address is assigned.

In step S12, the memory controller 7 determines whether or not the logical address assigned to the write data is an overwrite logical address. When the write data is data to which an overwrite logical address is assigned, the processing is shifted to step S13. In step S13, the memory controller 7 writes data to the memory 6. The data written in step S13 is management data, and is expected to be frequently overwritten. Hence, the memory controller 7 may perform write by using the cache block described in item [1-2-4].

On the other hand, as a result of the determination in step S12, when the logical address of the write data is the additional write logical address, the processing is shifted to step S14. In step S14, the memory controller 7 refers to the RAM 14 to determine whether or not the logical address of the write data is larger (higher in level) than the final assigned logical address.

As a result of the determination in step S14, when the logical address of the write data is not higher in level than the final assigned logical address, that is, when the request is a request for overwrite, the processing is moved to step S15. In step S15, the memory controller 7 transmits a write protect error to the host device 1 to refuse the write, and terminates the write operation.

On the other hand, as a result of the determination in step S14, when the logical address of the write data is higher in level than the final assigned logical address, the processing is shifted to step S16. The write data is sometimes requested to be written to a page in a physical block different from the physical block including the finally written page. In step S16, it is determined whether the write data should be written to a page in the physical block including the finally written page or to another physical block.

Figure 21:
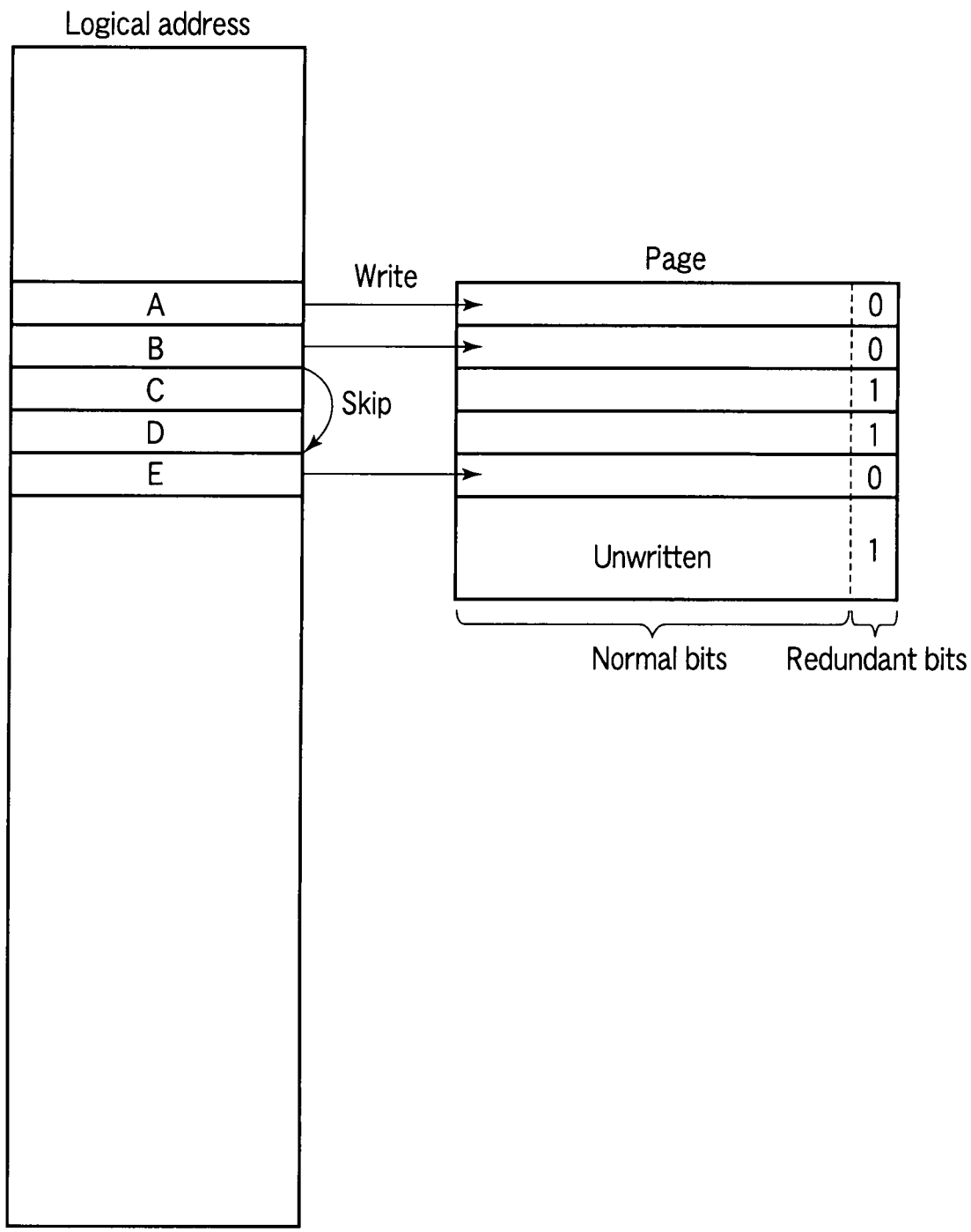
FIG. 21 is a view showing a result of the write processing of the memory card.

When the write data is written to a page in the physical block including the finally written page, the processing is shifted to step S17. In step S17, the memory controller 7 writes the write data to a page in the assigned physical block. At this time, the memory controller 7 writes a flag (for example, "0") indicating that data has already been written here to a bit in a redundant area of the page to be written as shown in FIG. 21. It should be noted that the write data to be written here is file data, and hence the memory controller can write the write data in the multiple-valued mode.

Then, in step S18, the memory controller 7 writes the final assigned logical address to the RAM 14.

On the other hand, in step S16, when the write data is written to a page in a physical block different from the physical block including the finally written page, the processing is shifted to step S19. In step S19, a physical block to which the write data is written is assigned. Here, when there is no erased physical block, the memory controller 7 erases a physical block holding no effective data, and writes the write data to this physical block.

Subsequently, in step S20, the memory controller 7 sets the address of the logical block corresponding to the physical block to which the write data has been written as the final assigned logical block address. Further, the final written logical block address is written to the memory 6 as a part of the control data of the memory controller 7. After this, the processing is shifted to step S17.

It should be noted that when the final assigned logical address coincides with the highest level additional write logical address, the memory controller 7 replaces the final assigned logical address with an address lower in level by one than the lowest level additional write logical address. That is, a state where no data is assigned to each of all the additional write logical addresses is artificially created. As a result of this, additional write by the memory controller 7 is continued. However, in the memory 6, data to which additional write logical addresses continuing from the lowest level are originally assigned are stored in the physical block (A), and hence the memory controller 7 writes the write data to a spare physical block (B) which is normally prepared as shown in FIG. 22. Thus, two physical blocks (A) and (B) are assigned to a logical block in which write of the latest data is performed. When the data write to the physical block (B) is completed, and write to another physical block further occurs, the physical block (B) which has been the spare block is treated as the original normal physical block, and the physical block (A) is treated as the spare block.

Further, as described above, the file system 4 assigns the logical address to the file data in the additional write system. Thus, the logical addresses of the write data are normally continuous. However, conversely, there may be some cases where a part of the logical addresses is skipped. For example, as shown in FIG. 21, in the consecutive logical addresses A to E, there is sometimes a case where after data items to which the logical addresses A and B are assigned are written, data to which the logical address E is assigned is requested to be written. In this case, even when data items to which the logical addresses C and D are assigned are present, the memory card 2 does not guarantee the contents of these data items. However, as described above, the logical addresses of the file data are normally continuous, and hence the restriction that the data are not guaranteed does not cause a great problem. If data of the skipped logical addresses are guaranteed, the memory card 2 has to perform the relocation processing. Therefore, it is possible to prevent the writing speed of the memory card 2 from being lowered without causing a great problem by the restriction.

[2-3-1] Assigning Operation of File System 4 (1)

The operation of assigning a logical address to write data performed by the file system 4 will be described below with reference to FIG. 23. FIG. 23 is a flowchart showing an assigning operation performed by the file system according to the embodiment of the present invention.

When a logical address is assigned to write data, the file system 4 refers to the register CT in step S21 to determine the type of the memory card 2. When the restriction of the logical address that can be assigned to the management data is not imposed on the memory card 2, i.e., when, for example, the register CT is 0, the processing is shifted to step S22. In step S22, the file system 4 assigns the logical address to the write data by the same method as the conventional FAT file system.

On the other hand, as a result of the determination of step S21, when the restriction is imposed on the assignment of the logical addresses that can be assigned to the management data, the processing is shifted to step S23.

In step S23, the file system 4 issues a data write authentication command to the memory card 2 to validate the write.

Then, in step S24, the file system 4 refers to the register CT to determine whether or not overwrite of the file data is possible. When overwrite is permitted, i.e., when, for example, the register OW is 0, the processing is shifted to step S25.

In step S25, the file system 4 retrieves the unassigned logical addresses. At this time the unassigned logical addresses are retrieved irrespectively of the order of the logical addresses to which the write data are assigned, and whether or not the logical addresses are continuous. Then, in step S26, the file system 4 assigns the retrieved unassigned logical addresses to the write data. Then, in step S27, the file system 4 performs update of FAT, and the directory entry so that the assignment in step S26 can be reflected. Then, the processing is shifted to step S28.

On the other hand, as a result of the determination in step S24, when overwrite is inhibited, the processing is shifted to step S31. In step S31, the file system 4 issues a final assigned logical address transmission request command to the memory card 2 to acquire the final assigned logical address. Then, in step S32, the file system 4 assigns a logical address (and logical addresses subsequent thereto) subsequent to the final assigned logical address to the write data. Then, in step S33, the file system 4 performs update of FAT, and the directory entry so that the assignment in step S32 can be reflected. Then, the processing is shifted to step S28.

In step S28, the file system 4 refers to the register FC to determine whether or not the memory card 2 rewrites FAT. When the memory card 2 does not rewrite FAT, the processing is terminated. On the other hand, when the memory card 2 rewrites FAT, the file system 4 reads out the contents of FAT from the memory card 2, and causes the contents to be reflected in FAT grasped by the file system 4. After this, the processing is terminated.

[2-3-2] Assigning Operation of File System 4 (2)

Figure 24:
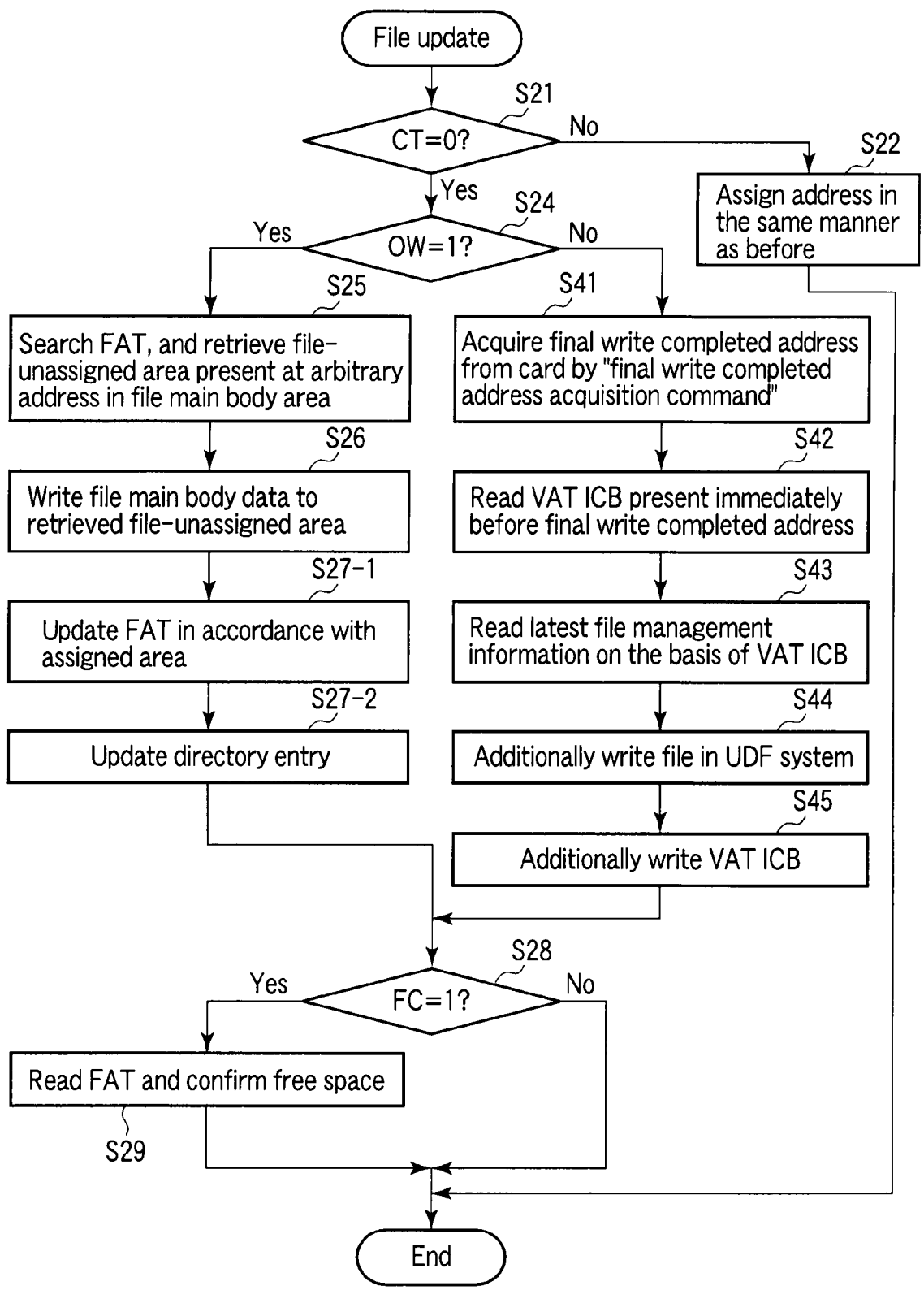
FIG. 24 is a flowchart of an allocation operation performed by the additional write file system.
Figure 25:
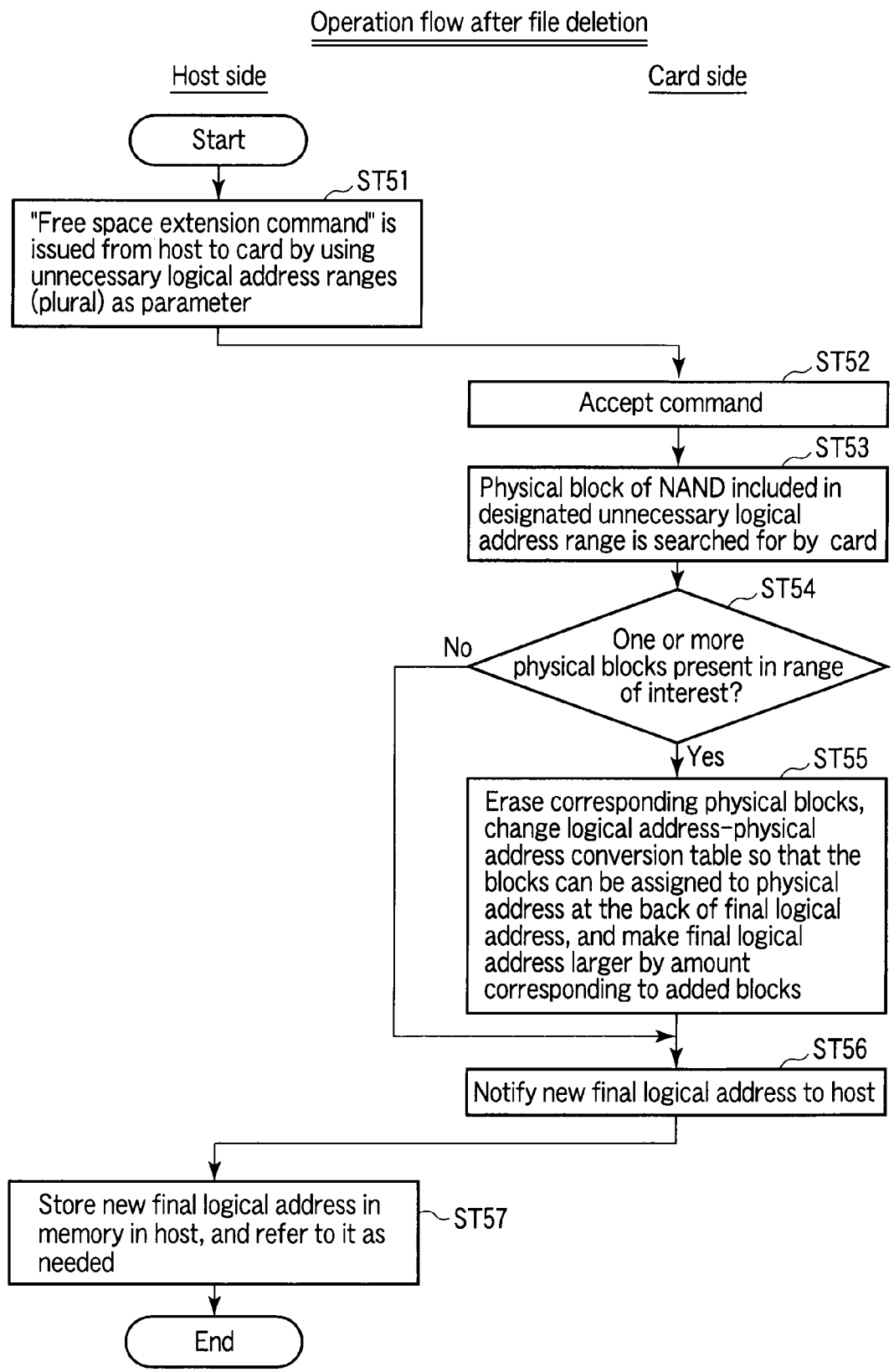
FIG. 25 is a flowchart of a logical address assignment operation to be performed after deletion of a file.

Next, the operation of assigning a logical address to write data performed by the file system 4 will be described below with reference to FIG. 24. FIG. 24 is a flowchart showing an assigning operation performed by the additional write UDF file system according to the embodiment of the present invention. In this description, the description of the part from step S21 to step S29 substantially overlapping with above [2-3-1] will be omitted.

This software refers to the card type flag to perform file write corresponding to the card type. That is, in above step S24, when additional write is permitted, or when the register OW is not 1, the processing is shifted to step S41.

It should be noted that in the same manner as described above, upon detecting in step S21, after the initialization processing of the card, that CT=1, the host device which performs file write by the software issues a dedicated data write permission command to the card to bring the card into a write-enabled state.

In step S41, the file system 4 acquires a final write completed address from the card by a "final write completed address acquisition command".

Then, in step S42, the file system 4 reads VAT ICB present immediately before the final write completed address.

Then, in step S43, the file system 4 reads the latest file management information on the basis of the read VAT ICB.

Then, in step S44, the file system 4 additionally writes a file in the UDF system. That is, the file system 4 additionally writes data in sequence to the memory space formatted into only UDF (additional write form) to thereby update the file.

Then, in step S45, the file system 4 additionally writes VAT ICB. Then, the processing is shifted to step S28, whereby the processing is terminated.

As described above, according to the operation of steps S41 to S45 described in this example, overwrite of data to the FAT area and directory entry is not needed, and hence the overwrite area may not be used. Accordingly, when only additional write UDF is used as in this example, application to a memory card for a memory space that is an address area in which, for example, an overwrite area is not present, and the entire normal user data area is formatted in the additional write system is further advantageous.

Incidentally, in this example, the file write operation has been described. However, the example can also be applied to the file read operation, and the same effect can be obtained. The application to the file read requires file read software of the UDF type.

[2-4] Readout

Next, the data readout operation will be described below. The readout operation is identical with that of a conventional memory card. That is, the host device 1 supplies a readout command to the memory card 2 without being conscious of whether or not the memory card 2 is a memory card 2 according to the embodiment of the present invention. The memory controller 7 converts the logical address of the readout data into a physical address by using the logical/physical conversion table. Then, the memory card 2 reads out data from the page (physical block) of the obtained physical address, and outputs the data to the host device 1.

As described in item [2-2], when two physical blocks (A) and (B) are assigned to one logical block, readout data is appropriately read out from these two physical blocks.

[2-5] Increasing Operation of Memory Free Space After File Deletion

Next, the increasing operation of a free space after deletion of a file will be described below with reference to FIGS. 25 to 30. Here, description will be given in accordance with the operation flow shown in FIG. 25.

Figure 26:
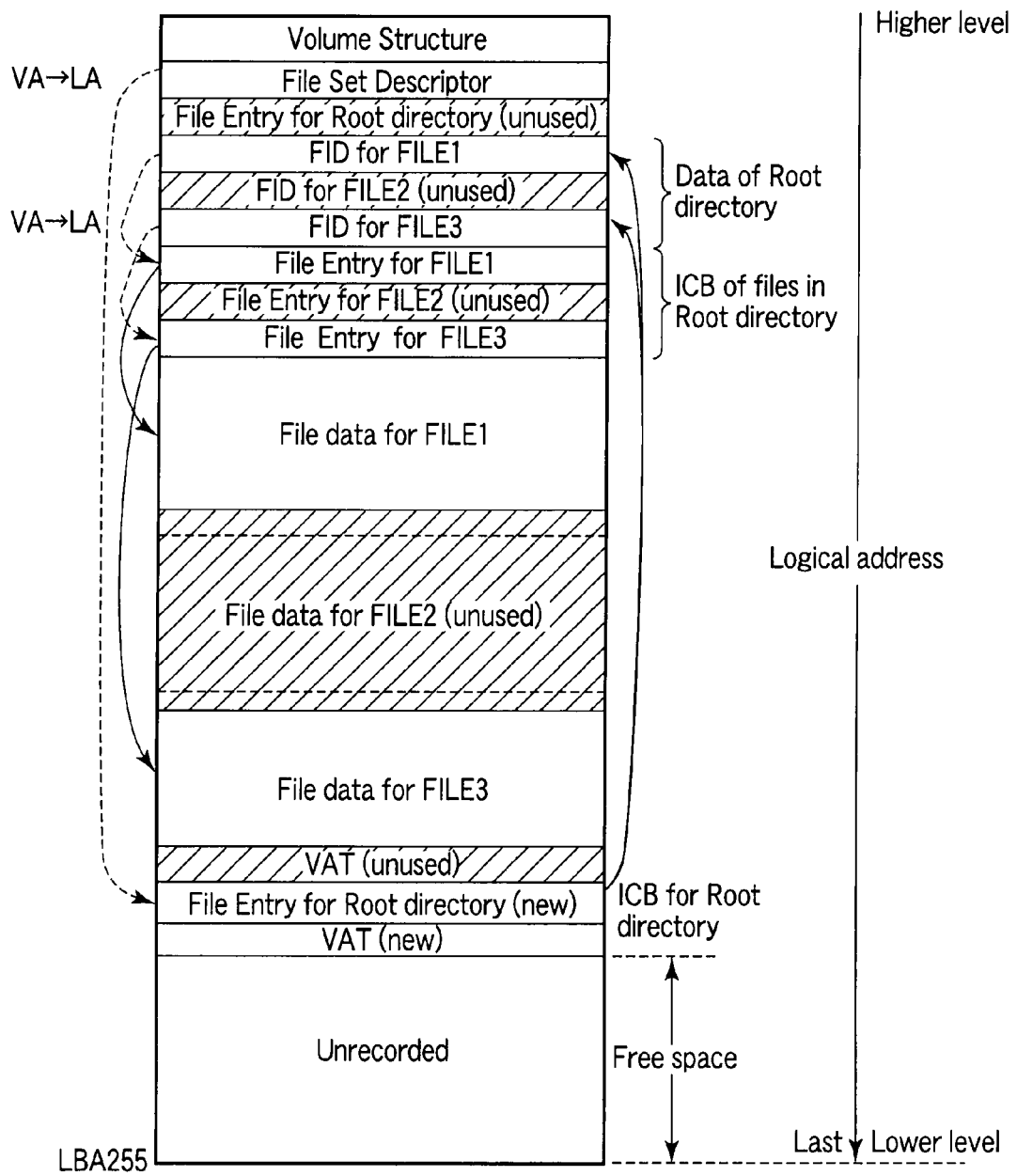
FIG. 26 is a view showing a logical address space of file deletion.

First, the host device 1 performs file deletion. The logical address space at this time is as shown in, for example, FIG. 26. As shown in FIG. 26, here, the case where a file (FILE2) of the file configuration formatted in the UDF-VAT type additional write file system is logically deleted (made "unused") will be described below as an example.

As shown in FIG. 26, the reference address to ICB of the root directory is changed by the virtual allocation table (VAT) (new) written to the final write completed address, and the file entry for root directory (new) (ICB) of the root directory (new) which has been additionally written anew is consulted in place of the old one. In ICB of the new root directory, reference to directory information (FID) for the file (FILE2) to be deleted is not included, FILE2 is not present from the viewpoint of the file system. For this reason, FILE2 has been logically deleted.

Further, in this example, three files (FILE1, FILE2, and FILE3) have been written to the root directory. As for each file, it is indicated by file management information called a file entry (ICB) in which address range on the logical address the file main body is present. As for the position of ICB of each of these files, it is indicated by directory information called FID to which address ICB of the file is written. As for the position of the directory information, it is indicated by ICB of the root directory to which address the directory information is written. As for ICB of the root directory, it is indicated by the file set descriptor present at a fixed position on the logical address at which logical address ICB of the root directory is present.

Further, above VAT is a conversion table of the virtual address (VA) written to the last part of the write completed area on the logical address, and the logical address (LA). However, more practically, although VAT is constituted of the VAT main body and ICB (VAT ICB) for VAT, here, for the simplification of description, both the VAT main body and ICB are collectively described as VAT. As address reference from the file set descriptor to ICB of the root directory, and address reference from each FID to ICB of each file, those converted by the conversion table written to VAT are actually used. Accordingly, new VAT is additionally written to the last part of the write completed area to change the contents of VAT, whereby it is possible to change the address reference to ICB of the root directory and the address reference to ICB of each file in such a manner that each address reference indicate another ICB without changing the values of the file set descriptor to each ICB and FID itself by the overwrite. As described above, in UDF-VAT, rewrite of the file, and deletion of the file by additional write are realized by the above method.

(Step S51)

As shown in FIG. 27, the host device 1 issues a "free space extension command (logical address range information) COM1" to the memory card 2 by using logical address ranges (plural) of the address ranges (areas in FIG. 26 marked "unused") which have become unnecessary in view of the file configuration as a parameter. Here, the "free space extension command COM1" is a command which is not described in the specification of the existing memory card (for example, SD card (registered trade name) and the like) shown in this example, and is a dedicated command to be newly defined.

(Step S52)

Subsequently, the memory card 2 accepts the issued free space extension command (COM1).

(Step S53)

Subsequently, the memory card 2 searches for a physical block in the NAND flash memory 6 included in the designated unnecessary logical address range. More specifically, the memory controller 7 checks whether or not an erase block is present in the NAND flash memory 6 included in the logical address range designated as the unnecessary range. At this time, the memory controller 7 refers to the logical address-physical address conversion table.

(Step S54)

Subsequently, the memory card 2 checks whether or not one or more physical blocks are present in the range of interest. When one or more physical blocks are not found as a result of the check, the processing is continued to step S56.

(Step S55)

Subsequently, when, as a result of the check of step S54, there are one or more erase blocks, the memory card 2 erases the erase blocks, and assigns the blocks to the back of the final logical address at that time. At the same time, the memory controller 7 changes the logical address-physical address conversion table, and the final logical address stored in the NAND flash memory 6.

Figure 28:
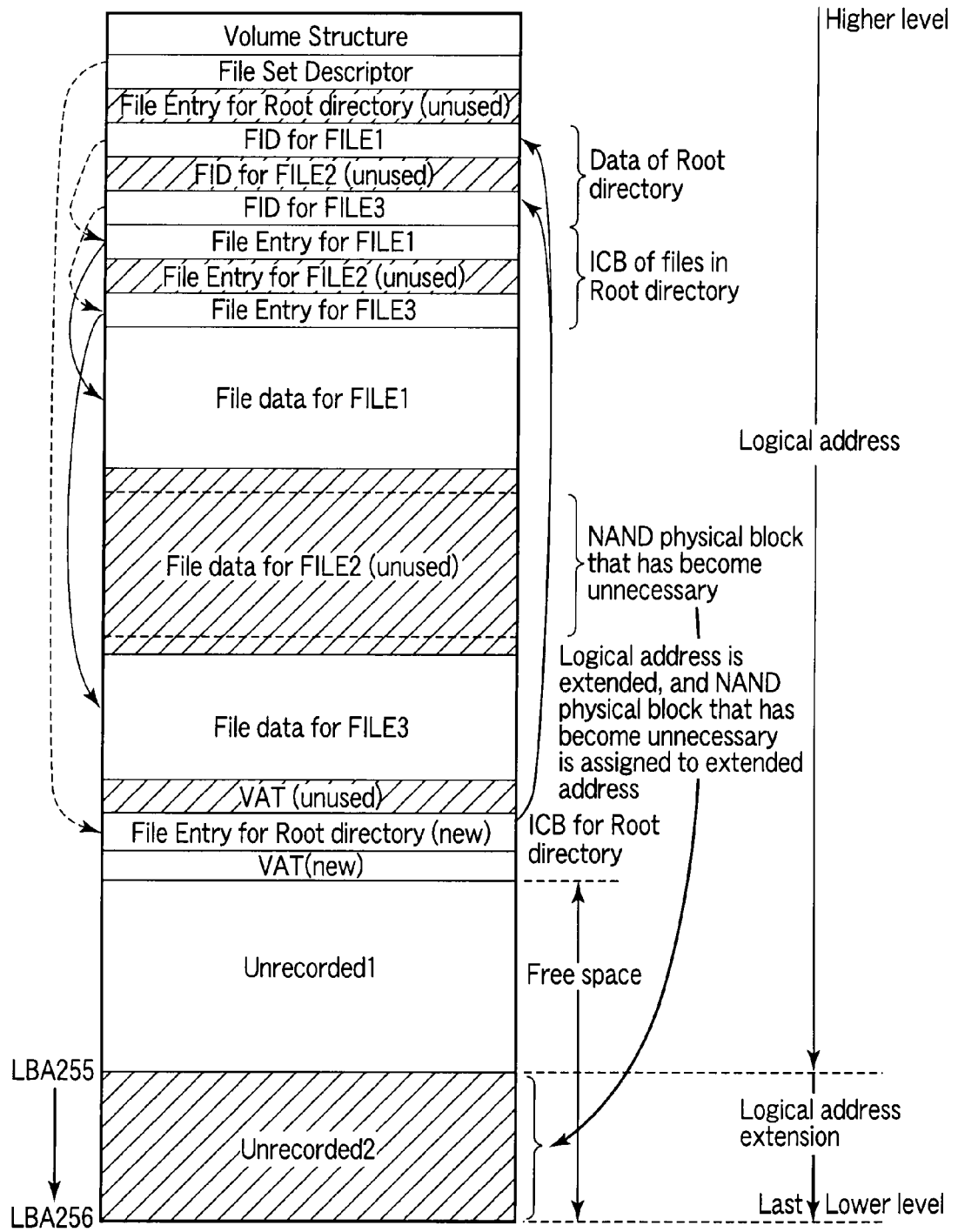
FIG. 28 is a view showing the logical address extension after the file deletion.

The logical address space at the time of step S55 is as shown in, for example, FIG. 28. As shown in FIG. 28, as a result of the check of step S54, when one or more erase blocks (FILE2 ("unused")) are present, the erase block (FILE2) is erased, and the erased block is assigned to the back of the final logical address at the time (for example, LBA255→LBA256). At the same time, the memory controller 7 changes the logical address-physical address conversion table, and the final logical address stored in the NAND flash memory 6 (LBA255→LBA256).

As shown in FIG. 28, the free space can be made larger than the logical address space before this operation is performed shown in FIG. 26 by the amount unrecorded2 (LBA255→LBA256) of the extended logical address indicated by the hatch lines. Accordingly, in the UDF-VAT additional write file system like this example, even when the deleted erase block FILE2 main body information on the actual logical address remains, the free space can be increased.

Furthermore, in the case of this example, the processing to be performed for the free space of the NAND flash memory is only the erase operation. Accordingly, write of data of a large amount does not occur unlike the case of the garbage collection where data after the data address area that has become unnecessary has to be rewritten by tightening the unnecessary data area. As a result of this, the processing can be made faster, and the convenience can be improved. Moreover, the advantage of reducing the number of times of write to the NAND flash memory 6 can also be obtained.

(Step S56)

Subsequently, as shown in FIG. 27, the memory controller 6 notifies the final logical address (for example, LBA256) after the change made after the completion of step S55 to the host device 1 as a response to the "free space extension command COM1".

(Step S57)

Subsequently, the host device 1 stores the final logical address (LBA256) notified from the memory card 2 in the memory in the host device 1, and refers to the final logical address when the host device 1 accesses the card thereafter. Further, the host device 1 recalculates the memory free space on the basis of the final logical address (LBA256) information notified thereto, and uses the calculated memory free space when the host device 1 accesses the file thereafter.

By the steps described above, the increasing operation of a free space after deletion of a file of this example is ended.

Modification Example

Case of Units of Pages

Next, an example in which the increasing operation of a free space after deletion of a file is performed in units of pages will be described below with reference to FIG. 29. In this description, the explanation overlapping the above explanation will be omitted.

In the example described above, an example in which logical address/physical address conversion is managed in units of erase blocks, and the unnecessary area is searched for in units of erase blocks has been shown. Here is an example in which a memory controller 7 that manages the logical address/physical address conversion in units of finer pages searches for an unnecessary area in units of pages.

Figures 29, 30:
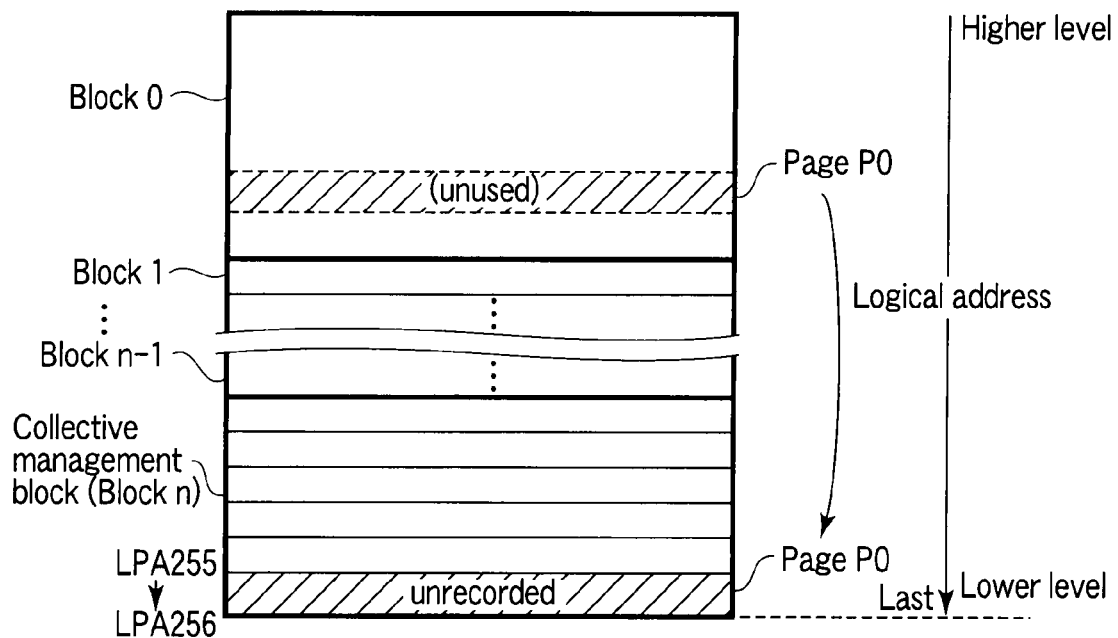
FIG. 29 is a view showing an example of a case of a page unit.
FIG. 30 is a view showing an additional write device information area according to a second embodiment.

As shown in FIG. 29, in this case, at the time of above step S55, unnecessary pages P0 which are a part of data are moved by the memory controller 7 in such a manner that unnecessary pages P0 are gathered in one erase block (collective management block) Block n.

Subsequently, the memory controller 7 assigns the erase block (collective management block) Block n to the extended logical address (for example, LPA255→LPA256).

As described above, the memory system and the host device according to this modification example are advantageous in the point that control can be performed in such a manner that data is erased, and the free space is increased in units of finer pages.

[Initialization]

Here, a case is conceivable where when the increasing operation of a free space after deletion of a file according to the first embodiment or the modification example described above is repeated, the final logical address becomes gradually larger, and the maximum processible logical address is exceeded in terms of the bus specification of the memory card 2.

In such a case, in order to additionally write data to the memory card 2 in the additional write system, it is necessary to reformat the memory card 2. Incidentally, at this time, the written data is lost.

At the time of the reformatting, it is necessary to restore the assignment of the physical block of the NAND flash memory 6 to the logical address to the initial state, and restore the final logical address to the initial state. Accordingly, a "logical address initialization command" is newly defined.

That is, the host device 1 issues the "logical address initialization command" to the memory card 2 prior to the reformatting.

Subsequently, upon receipt of the "logical address initialization command", the memory controller 7 erases all the physical blocks in the user area of the NAND flash memory 6, and restores the logical address-physical address conversion table of the user area, and the final logical address written to the NAND flash memory 6 to the initial state.

Accordingly, the above procedure is advantageous in the point that even when the maximum processible logical address of the NAND flash memory is exceeded, the memory card 2 can be reformatted, and data can be further additionally written to the memory card 2 in the additional write system.

Application Example

It should be noted that in the above description, the example of the UDF-VAT type additional write file system in which the SD card (registered trade name) is the representative example has been explained as an example. However, the example can also be applied to another similar flash memory device or another additional write file system, and the similar effect can be obtained.

[3] Effect of First Embodiment and Modification Example

According to the memory system and the host device thereof, at least the effect of the following item (1) can be obtained.

(1) The processing speed can be enhanced, and the convenience can be improved.

As described above, the memory system according to this example includes a memory controller 7 for controlling the nonvolatile memory 6 to extend the maximum value of the logical address by erasing data (FILE2) of the nonvolatile memory 6 that has become unnecessary in accordance with the command (free space extension command COM1) from the outside (host device) 1, and reassigning the data (FILE2) that has become unnecessary to the memory area assigned to a part of the logical address (LBA255→LBA256).

Further, the host device 1 according to this example is a host device of a memory system 2 formatted in the additional write file system, issues a command (free space extension command COM1) to extend the maximum logical address range to the memory system 2, and recalculates a usable free memory area on the basis of the value (LBA255~LBA256) of the maximum logical address range after the extension.

Accordingly, the free space can be made larger than the logical address space before this operation is performed shown in FIG. 26 by the amount unrecorded2 (LBA255→LBA256) of the extended logical address indicated by the hatch lines. Accordingly, in the UDF-VAT additional write file system like this example, even when the deleted erase block FILE2 main body on the actual logical address remains, the free space can be increased.

Furthermore, in the case of this example, the processing to be performed for the free space of the NAND flash memory is only the erase operation. Accordingly, write of data of a large amount does not occur unlike the case of the garbage collection where data after the data address area that has become unnecessary has to be rewritten by tightening the unnecessary data area. As a result of this, the above example is advantageous in the point that the processing can be made faster, and the convenience can be improved. Moreover, the advantage of reducing the number of times of write to the NAND flash memory 6 can also be obtained.

Second Embodiment

Other Descriptions of File System and the Like

Next, a memory system and a host device according to a second embodiment will be described below with reference to FIGS. 30 to 40. This embodiment relates to other descriptions of the file system and the like which have not been described in the first embodiment. In the descriptions, the detailed description of the part overlapping with the first embodiment will be omitted.

[11] Outline of UDF Additional Write File System (UDF-VAT)

This overlaps with the first embodiment, and hence the detailed description will be omitted.

[12] On Application example of Memory System 2

Figure 39:
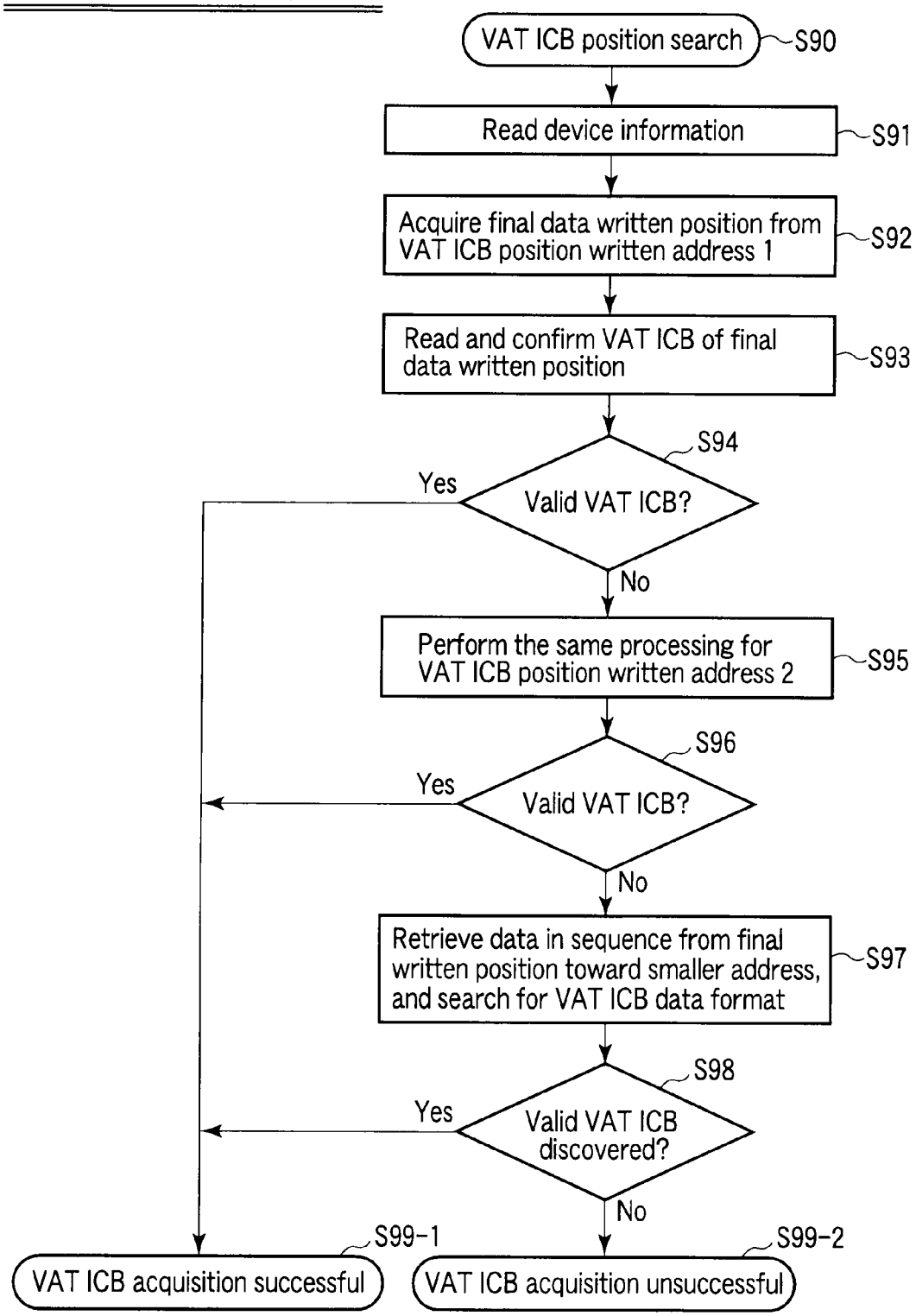
FIG. 39 is a flowchart showing a position searching operation of VAT ICB.

An application example of the block of the NAND flash memory 6 will be described later in connection with FIG. 39.

[12-1] Normal User Data Area

In the memory card 2 according to this example, the normal user data area 24 is used in the multiple-valued mode, and secure a capacity as much as possible. The normal user data area 24 is used as an additional write data area. In the additional write area 24, logical address-physical address conversion is performed in units of blocks. It should be noted that even in this case, even when the area 24 is used in the multiple-valued mode, a block to be used in the two-valued mode may be used as a buffer to temporarily store write data.

Further, the memory controller 7 secures a block for storing its own control data (system data) as nonvolatile data in the block of the NAND flash memory 6, and uses this block also in the two-valued mode.

[12-2] Protect Data Area

In the case of the memory card 2 according to this example, secure data areas (protect data areas) 21 to 23 are also present in addition to the normal user data area 24, and each of them is file-formatted as a volume. In this example, all the protect data areas are overwrite-permitted areas, a block of two-valued mode of the NAND flash memory 6 is assigned to each of them, and, for example, the FAT file system is used. This is because the capacity of the protect data areas 21 to 23 is small, the file data main body is frequently subjected to fine data update, and hence the overwrite-enabled FAT file system is suited to them. However, when fine data update does not occur depending on the application, the protect data areas 21 to 23 may be configured as the additional write data areas like the normal data areas.

[13] Device Information

Next, device information provided in the memory card 2 according to this example will be described below with reference to FIGS. 30 to 32.

Figure 31:
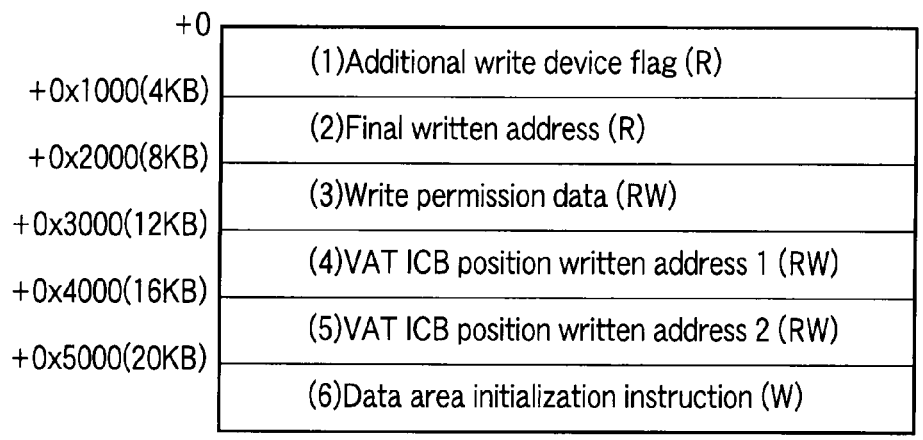
FIG. 31 is a view showing an additional write device information area according to the second embodiment.
Figure 32:
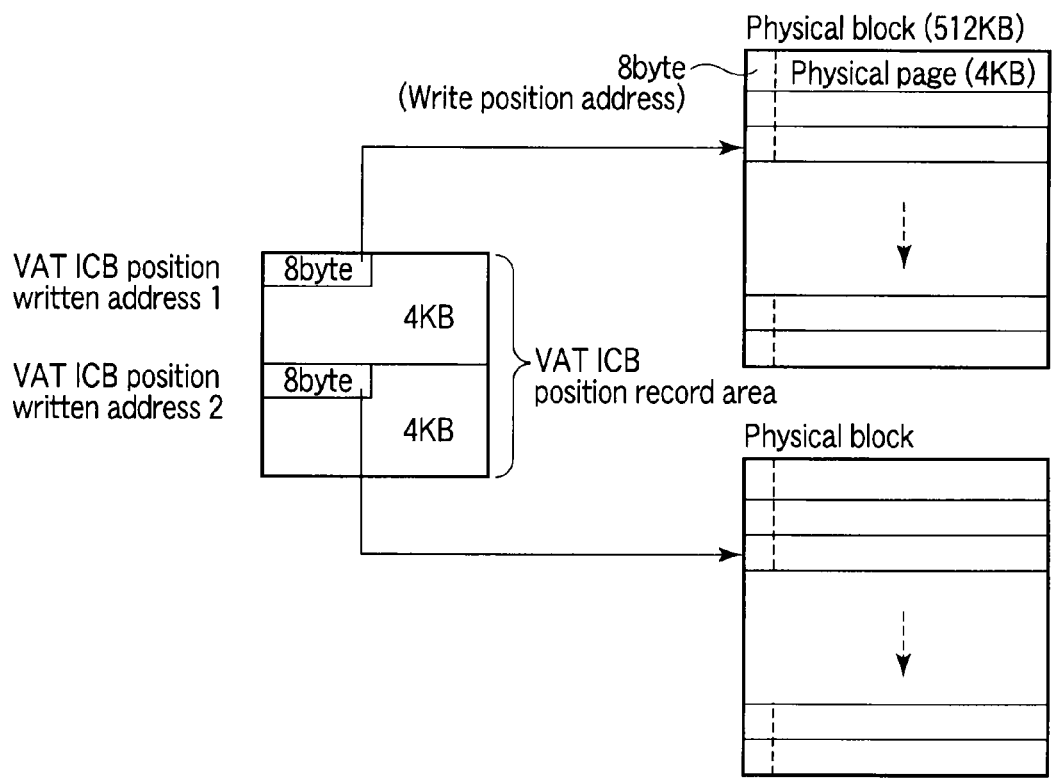
FIG. 32 is a view showing an example in which a register is provided on a memory map.

As shown in FIGS. 30 to 32, the memory card 2 according to this example includes "device information" in, for example, the register 15 of the SD interface 11 of the memory controller 7.

Each of these items of device information is card information to be acquired by the host device 1 from the memory card 2, and is information added to the memory card 2 to realize the operation to be described later. These items of information include the following, and are prepared in the memory controller 7 as, for example, an SD card register to be accessed by a dedicated SD card command.

(1) Additional Write Device Flag

The additional write device flag is a flag indicating whether the memory card 2 is a memory card 2 having the additional write card interface of this example or an overwrite memory card 2. Further, the additional write device flag is a read-only register. For example, data "1" indicates additional write, and data "0" indicates overwrite.

(2) Final Written Address

The final written address (R) is an address used by the memory controller 7 to indicate the finally written logical address in the additional write area to the host device. This address is also a read-only register.

(3) Write Permission data

The write permission data (RW) is write software needed to write a file to the memory card 2 or update the memory card 2 when a different dedicated file system is applied. For example, when a file is written to the memory card 2 of this example by using the conventional file write software for card, there is the possibility of the file format being broken. Thus, in the memory card 2 of this example, a dedicated data write permission command is provided. The memory card 2 accepts data write command to write data to the additional write area issued from the host device 1 only after this data write permission command is accepted after the initialization. Before accepting the data write permission command, a write protect error is returned at all times in response to a write command.

The write permission data register has a size of, for example, 8 bytes, and data write to the additional write area is permitted by writing 0x01, 0x23, 0x45, 0x67, 0x89, 0xAB, 0xCD, and 0xEF to this register. This write permission data register is a write/read-enabled register, and write permission data is written as the write data. When data is read therefrom, it is indicated whether or not write is permitted. In the write-permitted state, the register becomes all0xFF, and in the non-permitted state, all 0x00 is read out.

(4), (5) VAT ICB Position Written Addresses 1, 2 (RW)

Each of the VAT ICB position written addresses 1, 2 (RW) is an address for holding the address of the VAT ICB position written by the host device 1.

For example, the host device 1 writes a VAT ICB position of 8 bytes, and the memory controller 7 stores the address of the position in the NAND flash memory 6 as a part of the system data (management data).

The data is frequently rewritten by the host device 1. Thus, as shown in FIG. 32 showing an example in which a register is provided on the memory map, the host device 1 prepares a dedicated NAND physical block, and internally performs additional write on the page, thereby holding the data. Here, when the block becomes full, another spare block is used, and the filled block is erased and reused.

It should be noted that the VAT ICB position written addresses 1, 2 are important data written by the host device 1, and hence the data is duplexed, and two registers are provided. The host device 1 writes the same data in sequence to these two registers.

(6) Data Area Initialization Instruction (W)

In the memory card 2 according to this example, the additional write area is formatted in such a manner that data can be written only to an address larger than the logical address subsequent to the final written address. Thus, the data area initialization instruction (W) is a register for instructing to enable data to be written again from the head of the logical addresses of the additional write area. For example, the host device 1 writes data "1" to the register, whereby the final written address is initialized, and it becomes possible to write data again from the head of the logical addresses.

Here, as described above, FIGS. 30 and 31 each show an implementation example of device information.

In FIG. 30, an example, in which, for example, the device information is configured as the register 15 in the controller, and the register 15 is read or written by a dedicated command of the SD card interface 11 is shown. In this case, effective information access using the dedicated command is enabled.

In FIG. 31, an example in which device information is mapped in a partial address area of the normal memory area, and can be accessed by the normal memory read/write command on the SD card interface 11 is shown. In this case, a dedicated command is not used, and hence an advantage is obtained that even with the USB RW specification that does not support the new command, device information can be written or read by the software on the host device (such as a PC and the like) 1 side.

Further, in FIG. 31, an area of a certain amount on the logical address of the normal area is reserved in advance for the device information described above, normal read or write is not actually performed at the area, and it is possible to access the device information register by writing or reading a specific address with a normal SD write/read command. Further, in the example of FIG. 32, each register is placed at the head of a memory address provided at intervals of 4 KB so that each register can be accessed by normal SD write/read.

It should be noted that when the device information is placed on the memory, in, for example, the memory card 2 formatted in the overwrite system, the area is a normal overwrite memory area (write/read-enabled).

When checking the value of the additional write device flag, the host device 1 writes data of All "0" of 512 B (1 data block on the SD bus) to the logical address, and reads the data. When the data of All "0" can be actually written, the memory card 2 is a memory card 2 formatted in the overwrite system. On the other hand, when not 0x00 but 0x01 can be read out to the leading 1 byte, the memory card 2 is judged to be of the additional write device.

Figure 33:
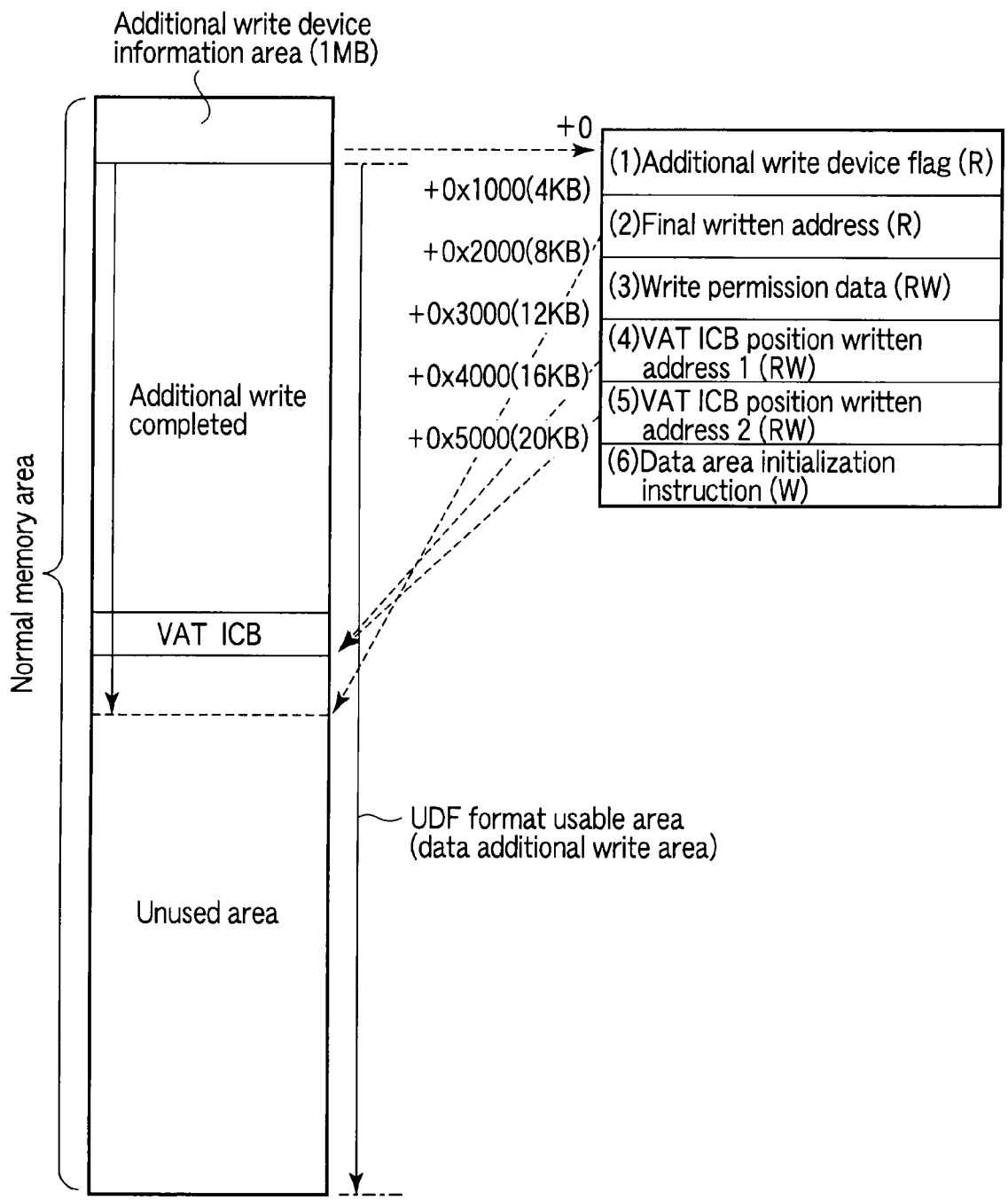
FIG. 33 is a view showing a case where a device information area is at the head of logical addresses.
Figure 34:
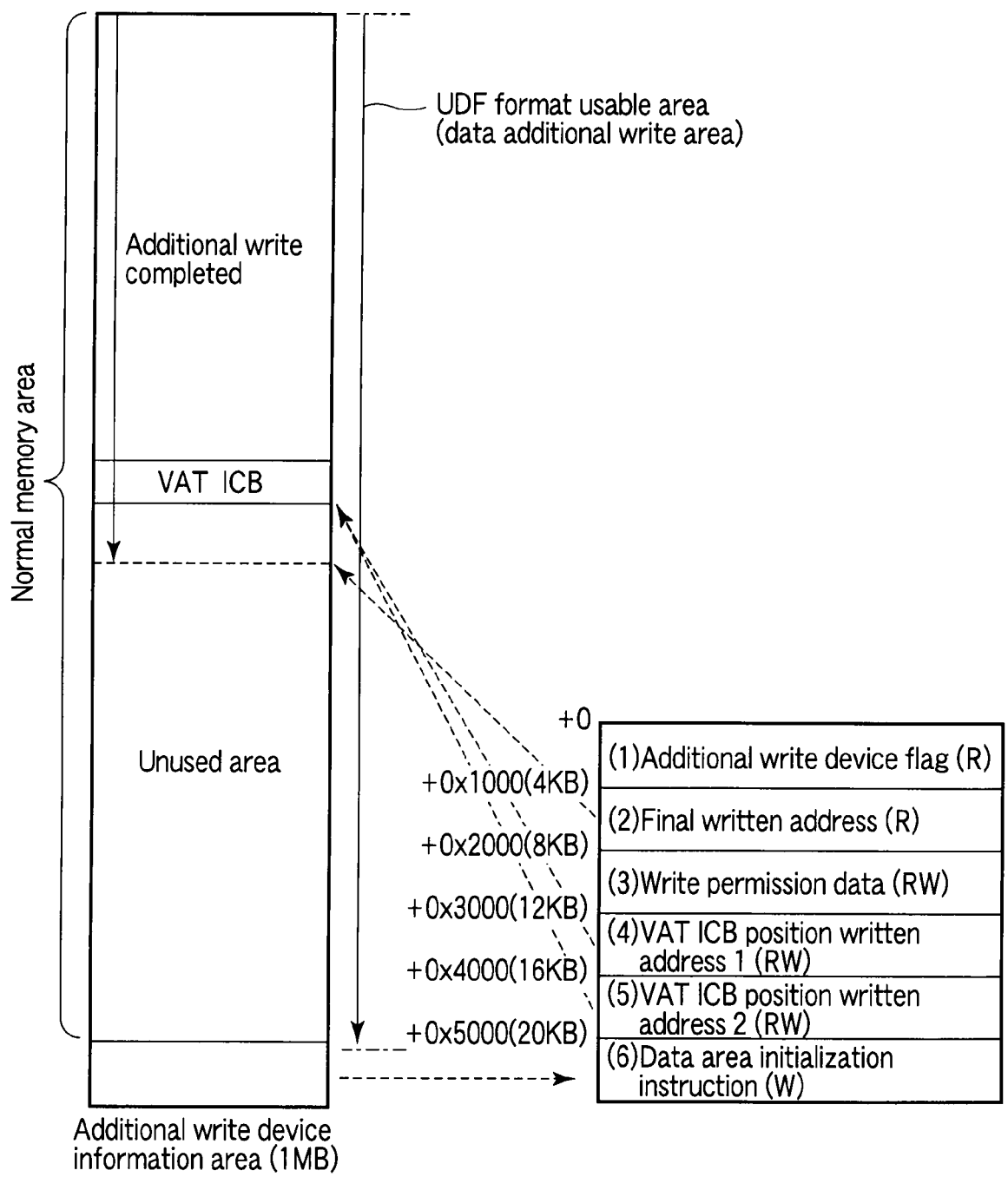
FIG. 34 is a view showing a case where a device information area is at the end of logical addresses.

FIG. 33 shows an example in which the device information area shown in FIG. 31 is placed at the head of the logical address. FIG. 34 shows an example in which the device information area shown in FIG. 31 is placed at the end of the logical address.

Here, the configuration in either one of FIG. 30 and FIG. 31 may be used. However, in this example, description will be given of an example in which the register shown in FIG. 30 is accessed by using a dedicated command.

[14] Data Write Operation on the Memory Card Side

Next, the data write operation on the memory card 2 side according to this example will be described below with reference to FIGS. 35 and 36. Here, description will be given in accordance with the flowchart of FIG. 36.

[14-1] At the Time of Initialization

Figure 35:
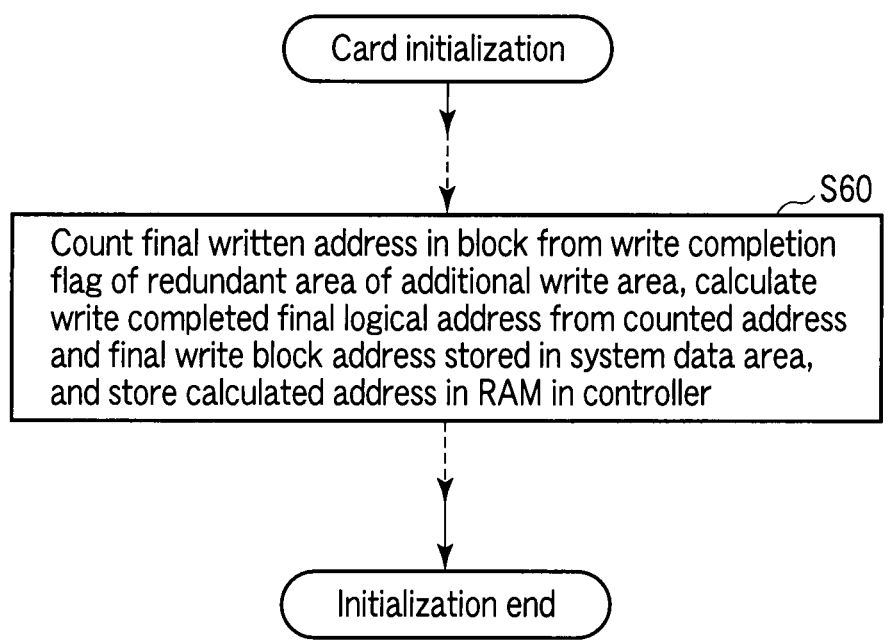
FIG. 35 is a flowchart showing initialization processing of the memory card.

Here, as shown in FIG. 35, at the time of initialization, in addition to the normal card initialization processing, the write completed final address (logical sector address) in the additional write area is calculated in the following manner, and the calculated address is stored in the controller.

(1) First, the memory controller 7 reads out the latest write logical block address stored in the system data area 21.

(2) Subsequently, the memory controller 7 refers to the write completion flag present in the redundant area of each page of the physical block corresponding to the latest write logical block address which has been read out to obtain the final written page address in the block. Here, as shown in FIG. 21, the largest page in which the write completion flag is data "0" is made the final written page.

(3) Subsequently, the memory controller 7 obtains the final written logical page address by the expression "latest write logical block address×number of pages in block+final written page address in block", calculates the final written sector address on the basis of the obtained final written logical page address, and stores the calculated final written sector address in the controller.

[14-2] Data Write

Figure 36:
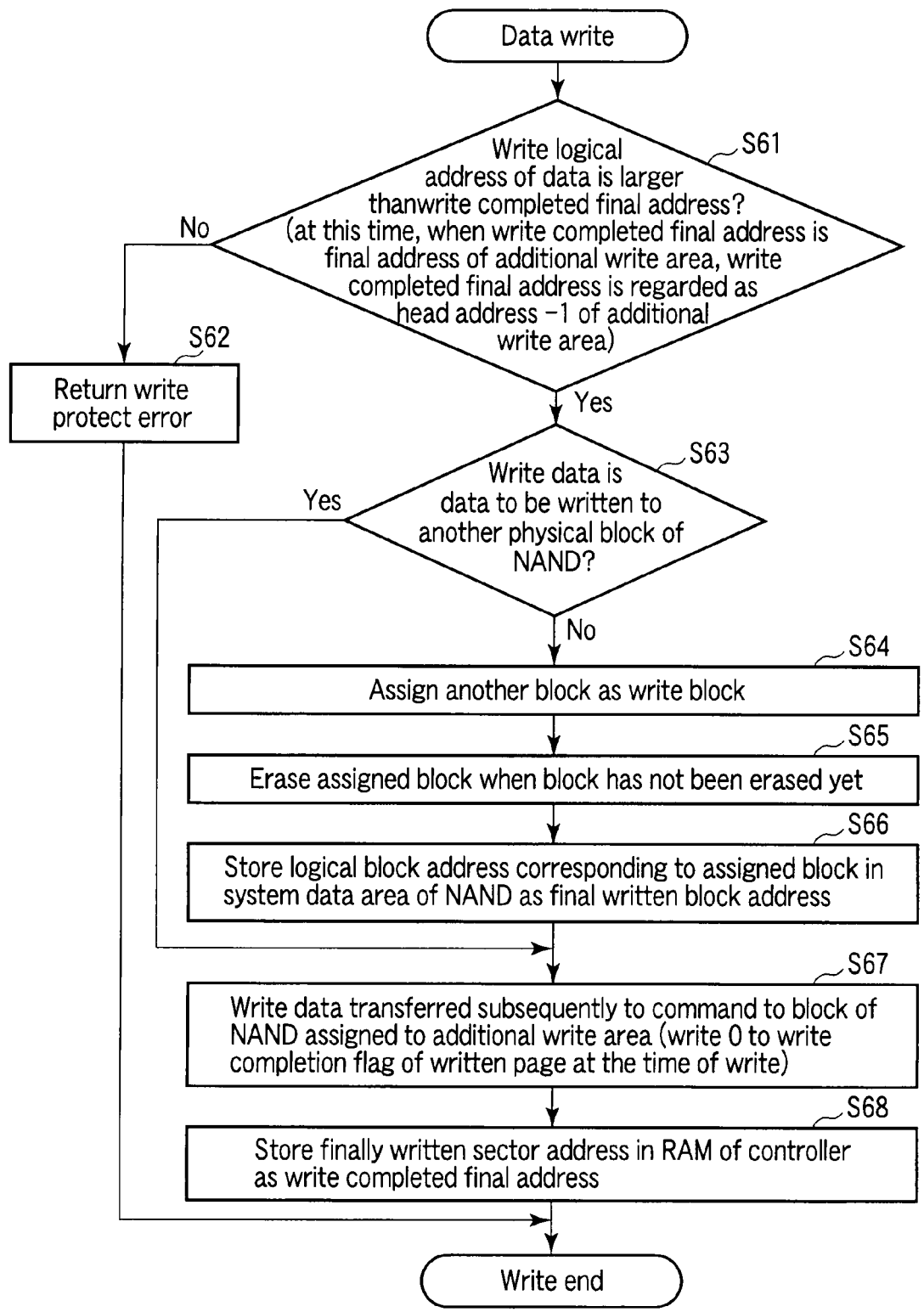
FIG. 36 is a flowchart of a case where processing of writing data to an additional write area of the memory card is performed.

As shown in FIG. 36, first, at the time of step S61, when the logical address of the data to be written is the additional write area, the memory controller 7 determines whether or not the logical address is an address after the write completed final logical address (that is, whether or not the write is the write in the additional write system).

Here, when the write completed final logical address corresponds to the final address of the additional write area, it is determined that the write completed final logical address is equivalent to the head address −1 (subtracted by one) of the additional write area, that is, the state where no data is written to the additional write area. As a result of this, immediately after data is written to the final address of the additional write area, it becomes possible to rewrite data from the head address of the additional write area.

It should be noted that in order to write data from the head of the additional write area, the initialization command of the additional write area to be described later may be used. On the assumption that only the initialization command of the additional write area is used, an example is conceivable in which the above-mentioned processing "for enabling rewrite of data from the head address of the additional write area when the write completed final logical address corresponds to the final address of the additional write area" is not performed.

Subsequently, at the time of step S62, when it is determined in step S61 that the logical address of the data to be written is not after the write completed final logical address (that is, when the write is not the additional write), the memory controller 7 returns a write protect error to the host device 1 to refuse data write.

Subsequently, at the time of step S63, when the logical address of the data to be written is after the write completed final logical address (that is, when the write is the additional write), the memory controller 7 determines whether or not the data is data to be written to another physical block of the NAND flash memory 6.

Subsequently, at the time of step S64, the memory controller 7 assigns another block as the write block. At this time, when it is necessary to assign, as a block to which data should be written, a physical block different from the physical block to which data has been written, the memory controller 7 writes a logical block address corresponding to the physical block to be newly assigned to the system data area of the NAND to store the logical block address therein.

Subsequently, at the time of step S65, when the assigned another block has not been erased yet, the memory controller 7 also performs erasure processing. The data of the erased block is, for example, All0xFF (data All "1").

Subsequently, at the time of step S66, the memory controller 7 stores a logical block address corresponding to the assigned block in the system data area 21 of the NAND flash memory 6 as the final written block address.

Here, once the additional write area is written up to the last address, it becomes possible to write data from the head address of the additional write area (see [15] to be described later). At this time, as for the physical block to be assigned to the write data, the physical block which has been assigned to the logical address block is not assigned, and a spare block is assigned to the write data. Accordingly, two physical blocks (A) and (B) are assigned to a logical address block in which write of the latest data is performed (FIG. 22). At this time, when the data write to the block is completed, and write to another block further occurs, the block (B) which has been the spare block shortly before is assigned as the physical block of the block, and the block (A) is made the spare block.

Figure 40:
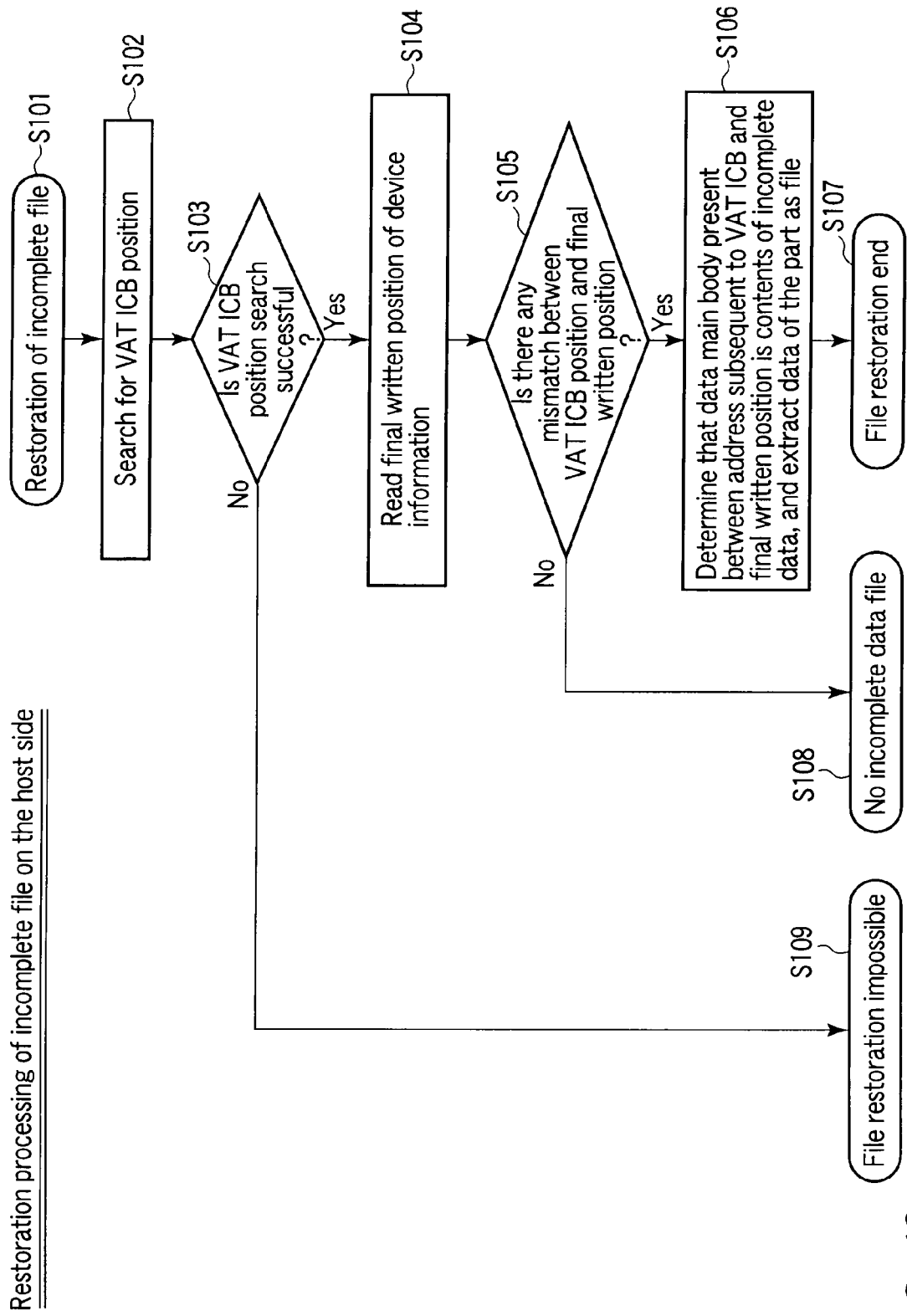
FIG. 40 is a flowchart showing restoration processing of an incomplete file on the host side.

Subsequently, at the time of step S67, the memory controller 7 performs data write to the actual NAND block in units of pages. At this time, the memory controller 7 writes data "0" to the "write completion flag" provided at a predetermined bit position of the redundant area of each written page (FIG. 40 to be described later).

Subsequently, at the time of step S68, the memory controller 7 further stores the finally written sector address in the RAM of the controller as the write completed final address.

It should be noted that an example is conceivable in which although data is written in the additional write system, the data to be written have addresses that are not continuous, and a part of the addresses are skipped (for example, the case of data write shown in FIG. 21). In this case, the contents of data of the skipped area are not guaranteed (as for the skipped part, it is not guaranteed that data before the write is held). However, in the case of the additional write system like this example, data write is normally performed with respect to consecutive addresses, and hence the above restriction does not cause a great problem. On the contrary, as a result of this, the advantage is obtained that the troublesome processing such as the relocation processing in the card is eliminated, and realization of the card is facilitated.

[14-3] Data Readout Operation

The data readout operation is performed by converting the logical address designated by a readout command into a physical address of the NAND flash memory 6, reading out the data of the address from the NAND flash memory 6, and outputting the data to the host device 1.

For example, when two physical blocks (A) and (B) are assigned to one logical block address as shown in FIG. 22, data of the newly written page is read out from the spare block (B), and data of the pages other than the above page is read out from the current block (A).

[14-4] Initialization of Additional Write Area

Figure 37:
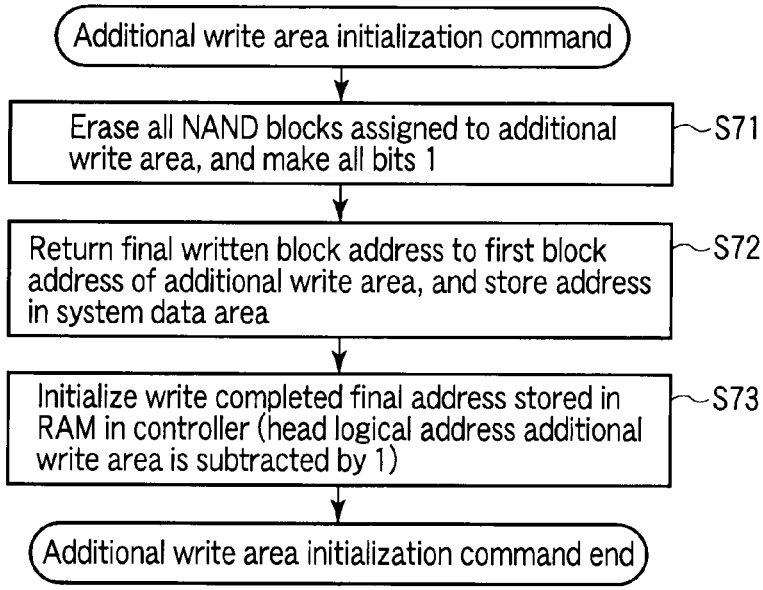
FIG. 37 is a flowchart showing an additional write area initialization operation.

Initialization of the additional write area will be described below with reference to FIG. 37. A dedicated command (actually, a register accessed by means of a dedicated command) used for executing the initialization of the additional write area is added to the SD card interface 11 of the memory controller 7 for this operation. Upon receipt of this command, the memory controller 7 performs the operation shown in the flowchart of FIG. 37.

First, at the time of step S71, the memory controller 7 erases all the NAND blocks assigned to the additional write area, and makes all the bits data "1".

Subsequently, at the time of step S72, the memory controller 7 returns the final written block address to the first block address of the additional write area, and stores the address in the system data area.

Subsequently, at the time of step S73, the memory controller 7 initializes (that is, the head logical address of the additional write area is subtracted by one (−1)) the write completed final address stored in the RAM 14 in the memory controller 7.

By the steps described above, all the block data in the additional write are erased, and the write completed final address is initialized. After this processing, it becomes possible to write data from the head address of the additional write area.

It should be noted that erasure of all the block data takes much time, and hence a dedicated command or a register for performing only the processing of initializing the final address without performing erasure may be provided. In this case, although data erasure is not performed, this method is advantageous in the point that it becomes possible again to write data from the head of the logical address, and perform logical reformatting of the additional write area at a high speed.

[14-5] Notification of Write Completed Final Logical Address

In order to notify the write completed final logical address, a dedicated command for notifying the write completed final logical address to the host device 1 is added to the SD card interface 11 of the memory controller 7. Upon receipt of this command, the memory controller 7 outputs the write completed final logical address stored in the RAM 14 of the controller 7 from the SD card interface 11 to the host device 1 as the response data.

[14-6] Data Write Permission Command

In order to write a file to the memory card 2 of this example, or update the memory card 2, dedicated file write software is needed. If a file is written to the card by using the file write software for the conventional card, there is the possibility of the file format being broken. Thus, in the memory card 2 of this example, dedicated data write permission command is provided. The memory card 2 accepts the data write command from the host device only after the card 2 has accepted this command after the initialization. Before the acceptance of this data write permission command, the memory card 2 returns a write protect error to the host device at all times in response to the data write command.

[14-7] Command by which Host Acquires Address of Overwrite-Permitted Area Range

A command to return data indicating the logical address of the upper limit of the overwrite-permitted area as response data is newly provided in the host device 1. At the time of logical formatting of the memory card 2, the host device 1 can grasp the upper limit of the overwrite-permitted area by using this command.

Furthermore, at the time of the logical formatting of the memory card 2, the host device 1 records the upper limit of the overwrite-permitted area on a part of the boot sector.

At the time of newly preparing a file or directory, the file system of the host device 1 refers to the upper limit address of the overwrite-permitted area of the boot sector, and prepares the new directory (file) entry at an address smaller than the upper limit address.

[15] Card Type Flag

The host device 1 can recognize whether a card is a card having an overwrite card interface or a card having an additional write interface by reading the device information. The host device 1 applies a file system (for example, FAT in the case of the overwrite interface, and UDF-VAT system in the case of the additional interface) corresponding to each memory card 2 to the card.

[16] File Update on the Host Side

Figure 38:
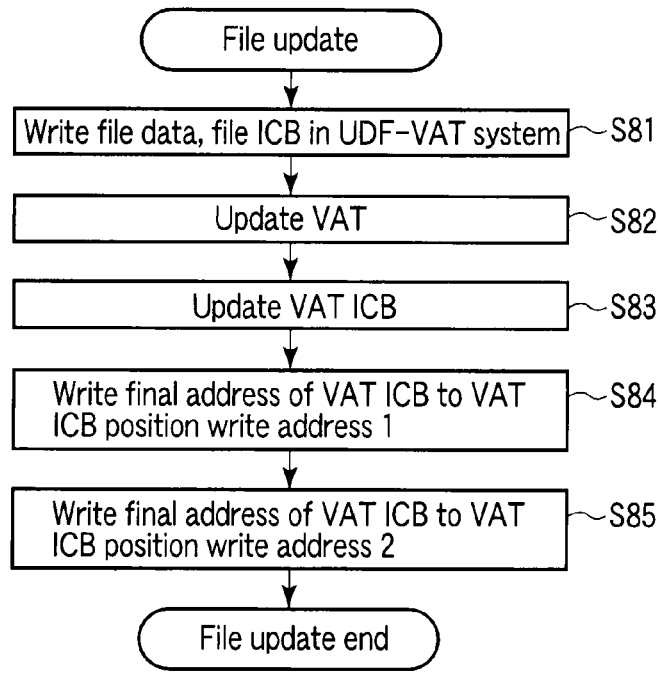
FIG. 38 is a flowchart showing a file updating operation on the host side.

Next, the file update on the host device 1 side will be described below with reference to FIG. 38. Here, description will be given in accordance with the flow of FIG. 38.

Here, the software of the host device 1 refers to the card type flag to perform file write corresponding to the card type. Upon detecting, after the initialization processing of the card, that the card is an additional write card, the host device 1 which performs file write by the software issues a dedicated data write permission command to the card to bring the card into the write-enabled state. The host device 1 additionally writes data in sequence to the additional write area in the UDF-VAT system to update the file.

That is, at the time of step S81, the host device 1 additionally writes the file ICB or file data main body in the UDF-VAT system.

Subsequently, at the time of steps S82 and S83, the host device 1 additionally writes VAT and VAT-ICB.

Subsequently, at the time of step S84, the host device 1 writes the final address of VAT ICB to the VAT ICB position written address 1 of the device information register.

Subsequently, at the time of step S85, the host device 1 writes the final address of VAT ICB to the VAT ICB position written address 2 of the device information register.

It should be noted that in UDF for DVD-R, although one sector is constituted of 2 KB, when the sector size is smaller, the utilization efficiency is higher. Further, when the sector size on the file system coincides with the minimum block size on the card interface, size conversion is not needed, and the configuration of the file access software is facilitated. Accordingly, in this example of the SD card, the sector size of UDF is, for example, about 512 B.

[17] VAT ICB Position Search Operation at the Time of Card Insertion

Next, the VAT ICB position search operation to be performed at the time of card insertion will be described below with reference to FIG. 39.

First, at the time of step S90, the host device 1 starts VAT ICB position search.

Subsequently, at the time of step S91, the host device 1 acquires the final data written position from the VAT ICB position written address 1.

Subsequently, at the time of step S92, the host device 1 reads the VAT ICB position written address 1 written to the device information.

Subsequently, at the time of step S93, the host device 1 checks data present at the address.

Subsequently, at the time of step S94, the host device 1 checks whether or not the data is of a valid data form specified by the UDF-VAT specification.

Subsequently, at the time of step S99-1, when the data is of a valid form, the host device 1 regards the VAT ICB acquisition as being successful, and performs the subsequent file access by using the data as VAT-ICB.

On the other hand, at the time of step S95, when the data is not of a valid form, the host device 1 reads the VAT ICB position written address 2 written to the device information.

Subsequently, at the time of step S96, the host device 1 confirms whether or not the address is VAT ICB of a valid form. At this time, when the address is of a valid form, the host device 1 performs the subsequent file access by using the data as VAT-ICB (S99-1).

On the other hand, at the time of step S97, when the address is not of a valid form, the host device 1 determines that the VAT ICB position information has not been normally updated for some reason or other, reads the final written address of the device information, and checks whether or not there is VAT-ICB format data while ascending from the address in sequence toward the upper level of the address as a search for the VAT-ICB format data.

Subsequently, at the time of step S98, the host device 1 attempts to discover valid VAT ICB.

Subsequently, at the time of step S99-2, when a valid VAT ICB form has not been discovered, the host device 1 determines that the VAT ICB acquisition is unsuccessful.

[18] Restoration Processing of Incomplete File

Next, the restoration processing of the incomplete file will be described below with reference to FIG. 40.

When the VAT-ICB position written to the device information and the final written address of the device information do not match with each other (that is, when the final written address is larger than the VAT-ICB position), the host device 1 considers that the card has been drawn out or the power of the host device has been shut down while the file data has been under update, whereby update of VAT-ICB and the VAT-ICB position information that have been under update is not completed yet.

In such a case, the host device 1 can try to restore the incomplete file by the processing of steps S101 to S109 shown in FIG. 40. In this case, the host device 1 tries to extract data present between the VAT-ICB position and the final written address of the device information as an incomplete file.

[19] Application Example

In the second embodiment, an example of application of the invention to the SD memory card 2 is shown. However, the application is not limited to this, and the invention can also be applied to other flash memory devices. Further, an example of UDF is shown as the additional write file system. However, the invention can also be applied to other additional write file systems.

[20] Effect

As has been described above, according to the memory system and the host device according to the second embodiment, at least the same effect as (1) is obtained. Furthermore, as the need arises, the invention can be applied to the configuration and operation of this example.

Further, the second embodiment includes the following aspects.

(1) A memory system that accepts only write of write data to which a logical address higher in level than a data write completed logical address is assigned.

(2) A memory system including means for providing information necessary for enabling the host device to calculate the final logical address in the card to which data has been written by the host device to the host device.

(3) A memory system in which the logical address range capable of accepting data write of the next time is changed in accordance with the logical address of data written by the host device last time.

(4) The memory system of (3) further includes means for notifying information indicative of a logical address range to which data of the next time can be written to the host device.

(5) The memory system of (3) further includes means for restoring a logical address range to which data can be written to the initial state in accordance with an instruction from the host device.

(6) When data is written to a logical address other than a logical address capable of accepting data write, the memory system of (3) outputs write error information corresponding to write protect to the host device.

(7) The memory system of (3) further includes means for notifying information indicative of a logical address range to which data of the next time can be written to the host device, and further includes means for holding the final data written position information at the time of file update set by the host device.

(8) The memory system of (3) further includes means for causing the host to give permission to start acceptance of data write.

(9) In a case where data is written to discontinuous logical addresses, it is not guaranteed that the same data as the data before the data write is read out when data is read out from the discontinuous address range.

(10) The memory system of (3) further includes means for providing the host device with information for determining whether a system is a system having the configuration as described in (3) or a device which accepts data write to an arbitrary logical address.

(11) The memory system of (9) further includes means for providing the host device with information for determining whether a system is a system having the configuration as described in (3) or a device in which even in a case where data is written to discontinuous addresses, it is guaranteed that the same data as the data before the data write is read out when data is read out from the discontinuous address range.

(12) The write-enabled address range information of (4) is notified to the host device by a memory read command of the host interface to read data from a predetermined address of the logical addresses.

(13) The final data written position information at the time of file update of (7) is set by the host and is notified to the host by means of a memory write/read command of the host interface to write/read data to/from a predetermined address of the logical addresses.

(14) The instruction to restore a logical address range to the initial state is achieved by predetermined data written by the host to a predetermined address of the logical addresses by means of a memory write command of the host interface.

(15) The determination information of (10) is notified to the host device by means of a memory read command of the host interface to read data from a predetermined address of the logical addresses.

(16) The memory system of (1) further includes means for notifying information indicative of a logical address range to which data of the next time can be written to the host, and further includes means for holding the final data written position information at the time of file update set by the host.

(17) The memory system of (2) further includes means for holding the final data written position information at the time of file update set by the host device.

(18) In a host device for writing a file to the memory system of (17) by using the additional write file system, when the final data format at the time of file update present immediately before an address indicated by the final data written position at the time of file update is an incorrect format, data search is performed in the direction from the final logical address to which data write to the card has been performed by the host device toward the head, thereby searching for the valid final data format at the time of file update.

(20) In a host device for writing a file to the memory system of (17) by using the additional write file system, when there is a mismatch between the address indicated by the final data written position at the time of file update and the final logical address to which data write to the card has been performed by the host device, file restoration processing is performed with respect to data present between both the addresses.

(21) In a host device for writing/reading a file to/from a memory system by using the UDF additional write file system, the sector size of UDF is made to coincide with the minimum data write unit on the host interface of the memory system.

(22) In a host system for writing/reading a file to/from a memory system by using the UDF additional write file system, the sector size of UDF is 512 B.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory system comprising:
a nonvolatile semiconductor memory; and
a memory controller configured to receive a first logical address and first data from an outside host device, the first logical address belonging to memory space of the memory system, and a maximum value of logical addresses of the memory space is a first value, wherein physical addresses of the nonvolatile semiconductor memory are assigned to logical addresses of the memory space, the memory controller being configured to:
convert the first logical address into a first physical address to write the first data to the nonvolatile semiconductor memory using the first physical address;
receive a command which designates the logical address range from the host device;
reassign physical addresses assigned to the logical addresses in the logical address range to logical addresses which are larger than the first value, wherein as a result of the reassigning, the logical addresses which have been assigned to the physical addresses before the controller reassigns are not assigned to any physical addresses of the nonvolatile semiconductor memory;
increase the maximum value of logical addresses of the memory space from the first value to a second value according to a result of the reassignment of the physical addresses;
receive a second logical address and second data from the host device after increasing the maximum value of logical addresses of the memory space to the second value, wherein the second logical address is larger than the first value but less than the second value; and
convert the second logical address into a second physical address to write the second data to the nonvolatile semiconductor memory using the second physical address.

2. The system according to claim 1, wherein the memory controller notifies the maximum value of logical address after the maximum value of the logical address has been extended to outside the memory system.

3. The system according to claim 2, wherein the memory controller restores the maximum value of the logical address to the first value in accordance with a command from outside the memory system.

4. The system according to claim 1, wherein the memory controller writes write data to which an overwrite logical address is assigned to the nonvolatile semiconductor memory in a two-valued mode.

5. The system according to claim 4, wherein the memory controller writes write data to which an additional write logical address is assigned to the nonvolatile semiconductor memory in a multiple-valued mode.

6. The system according to claim 1, wherein a unit in which the memory controller extends the maximum value is a block that is an erasure unit of the nonvolatile semiconductor memory.

7. The system according to claim 1, wherein a unit in which the memory controller extends the maximum value is a page that is a readout unit of the nonvolatile semiconductor memory, and
the memory controller moves unnecessary extended pages by gathering the pages in a collective management block which is an erasure unit of the nonvolatile semiconductor memory.

8. The system according to claim 1, wherein the memory controller is configured to inhibit data from being written to a logical address which is lower in level than a final logical address to which data is written.

9. The system according to claim 1, wherein data included in an unnecessary logical address range of the nonvolatile semiconductor memory is physically deleted.

10. The system according to claim 1, wherein the nonvolatile semiconductor memory is NAND flash memory.

11. The system according to claim 1, wherein the memory controller deletes data stored at the physical address which is reassigned to logical addresses which are larger than the first value.

12. A host device of a memory system formatted in an additional write file system, wherein the memory system comprises a memory controller and a nonvolatile semiconductor memory, the host device being configured to:
transmit a command which designates a logical address range to the memory controller; and
receive notifying of a maximum value of a logical address of a memory space according to a size of the logical address range from the memory controller,
wherein the memory controller is configured to receive a first logical address and first data from an outside host device, the first logical address belonging to memory space of the memory system, a maximum value of logical addresses of the memory space is a first value, physical addresses of the nonvolatile semiconductor memory are assigned to logical addresses of the memory space, the memory controller being configured to:
convert the first logical address into a first physical address to write the first data to the nonvolatile semiconductor memory using the first physical address;
receive a command which designates the logical address range from the host device;
reassign physical addresses assigned to the logical addresses in the logical address range to logical addresses which are larger than the first value, wherein as a result of the reassigning, the logical addresses which have been assigned to the physical addresses before the controller reassigns are not assigned to any physical addresses of the nonvolatile semiconductor memory;
increase the maximum value of logical addresses of the memory space from the first value to a second value according to a result of the reassignment of the physical addresses;
receive a second logical address and second data from the host device after increasing the maximum value of logical addresses of the memory space to the second value, wherein the second logical address is larger than the first value but less than the second value; and
convert the second logical address into a second physical address to write the second data to the nonvolatile semiconductor memory using the second physical address.

13. The device according to claim 12, wherein the host device further being configured to:
recalculate the memory space on the basis of the maximum value of a logical address; and
uses the calculated memory space if the host device accesses a file.

14. The device according to claim 13, the host device transmits a command to restore the maximum value of the logical address to the first value of the memory system.

15. The device according to claim 14, wherein a unit in which the maximum value is extended is a block that is an erasure unit of the nonvolatile semiconductor memory.

16. The device according to claim 14, wherein a unit in which the maximum value is extended is a page that is a readout unit of the nonvolatile semiconductor memory, and the memory controller moves unnecessary extended pages by gathering the pages in a collective management block which is an erasure unit of the nonvolatile semiconductor memory.

17. The device according to claim 12, wherein the memory controller is configured to inhibit data from being written to a logical address which is lower in level than a final logical address to which data is written.

18. The device according to claim 12, wherein data included in an unnecessary logical address range of the nonvolatile semiconductor memory is physically deleted.

* * * * *